United States Patent
Lee et al.

(10) Patent No.: US 9,813,615 B2
(45) Date of Patent: Nov. 7, 2017

(54) IMAGE PHOTOGRAPHING APPARATUS AND IMAGE PHOTOGRAPHING METHOD FOR GENERATING A SYNTHESIS IMAGE FROM A PLURALITY OF IMAGES

(71) Applicant: SAMSUNG ELECTRONICS CO., LTD., Suwon-si (KR)

(72) Inventors: Tae-hee Lee, Seoul (KR); Jae-gon Kim, Suwon-si (KR); Stepan Tuliakov, Suwon-si (KR); Sung-ho Lee, Suwon-si (KR); Seung-ryong Jeon, Incheon (KR); Kyoung-young Kim, Suwon-si (KR); Hyun-seok Hong, Suwon-si (KR); Hee-chul Han, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 19 days.

(21) Appl. No.: 14/806,871

(22) Filed: Jul. 23, 2015

(65) Prior Publication Data
US 2016/0028949 A1 Jan. 28, 2016

(30) Foreign Application Priority Data
Jul. 25, 2014 (KR) .................. 10-2014-0094830

(51) Int. Cl.
*H04N 5/232* (2006.01)
*G06T 3/40* (2006.01)
(Continued)

(52) U.S. Cl.
CPC ........... *H04N 5/23232* (2013.01); *G06T 3/40* (2013.01); *H04N 5/06* (2013.01); *H04N 5/2258* (2013.01);
(Continued)

(58) Field of Classification Search
CPC ............ H04N 5/2258; H04N 5/23229; H04N 5/23222; H04N 5/23296; H04N 5/2356;
(Continued)

(56) References Cited

U.S. PATENT DOCUMENTS 7,206,136 B2 4/2007 Labaziewicz et al.
7,305,180 B2 12/2007 Labaziewicz et al.
(Continued)

FOREIGN PATENT DOCUMENTS

JP 2011-257770 A 12/2011
KR 10-2012-0122398 A 11/2012

OTHER PUBLICATIONS

International Search Report for PCT/KR2015/007727 dated Nov. 18, 2015 [PCT/ISA/210].
(Continued)

*Primary Examiner* — Albert Cutler
(74) *Attorney, Agent, or Firm* — Sughrue Mion, PLLC

(57) ABSTRACT

An image photographing apparatus and an image photographing method are provided. The image photographing apparatus includes: a plurality of image capturers respectively comprising lenses having different focal distances and respectively configured to capture a plurality of images having different resolutions; a storage configured to store the plurality of images captured by the plurality of image capturers; an image processor configured to adjust properties of the plurality of images to correspond to each other; a controller configured to, in response to a magnification change command being input, control the image processor to synthesize the plurality of images of which the properties are adjusted and generate a synthesis image of a magnification changed according to the magnification change command; and a display configured to display the synthesis image.

31 Claims, 27 Drawing Sheets

(51) Int. Cl.
*H04N 5/247* (2006.01)
*H04N 5/06* (2006.01)
*H04N 5/225* (2006.01)

(52) U.S. Cl.
CPC ..... *H04N 5/23216* (2013.01); *H04N 5/23229* (2013.01); *H04N 5/23296* (2013.01); *H04N 5/247* (2013.01)

(58) Field of Classification Search
CPC ...... H04N 5/2628; H04N 5/272; H04N 5/341; H04N 5/3415; H04N 5/35545; H04N 5/23232; H04N 5/247; H04N 5/06; H04N 5/23216; G06T 3/40
See application file for complete search history.

(56) References Cited

U.S. PATENT DOCUMENTS

| | | |
|---|---|---|
| 2005/0270387 A1 | 12/2005 | Watanabe et al. |
| 2006/0187312 A1 | 8/2006 | Labaziewicz et al. |
| 2006/0275025 A1 | 12/2006 | Labaziewicz et al. |
| 2007/0025714 A1* | 2/2007 | Shiraki ................. G03B 13/36 396/72 |
| 2008/0030592 A1* | 2/2008 | Border ................... H04N 5/232 348/218.1 |
| 2009/0322891 A1* | 12/2009 | Kondo .................. G06T 3/4038 348/218.1 |
| 2010/0238313 A1* | 9/2010 | Ohki ........................ G06T 3/40 348/222.1 |
| 2012/0268641 A1* | 10/2012 | Kazama ............. H04N 5/23212 348/333.11 |
| 2013/0135449 A1* | 5/2013 | Horii ...................... G03B 35/10 348/49 |
| 2014/0132735 A1 | 5/2014 | Lee et al. |

OTHER PUBLICATIONS

Written Opinion for PCT/KR2015/007727 dated Nov. 18, 2015 [PCT/ISA/237].

* cited by examiner

FIG. 11

|   |   |   |   |   |   |
|---|---|---|---|---|---|
| Y | M | Y | M | Y | M |
| C | Y | C | Y | C | Y |
| Y | M | Y | M | Y | M |
| C | Y | C | Y | C | Y |
| Y | M | Y | M | Y | M |
| C | Y | C | Y | C | Y |

CMY Bayer Pattern (1110)

|   |   |   |   |   |   |
|---|---|---|---|---|---|
| G | R | G | R | G | R |
| B | G | B | G | B | G |
| G | R | G | R | G | R |
| B | G | B | G | B | G |
| G | R | G | R | G | R |
| B | G | B | G | B | G |

RGB Bayer Pattern (1120)

IMAGE PHOTOGRAPHING APPARATUS AND IMAGE PHOTOGRAPHING METHOD FOR GENERATING A SYNTHESIS IMAGE FROM A PLURALITY OF IMAGES

CROSS-REFERENCE TO RELATED APPLICATION

This application claims priority from Korean Patent Application No. 10-2014-0094830, filed on Jul. 25, 2014 in the Korean Intellectual Property Office, the disclosure of which is incorporated herein by reference in its entirety.

BACKGROUND

Field

Apparatuses and methods consistent with one or more exemplary embodiments relate to an image photographing apparatus and an image photographing method, and more particularly, to an image photographing apparatus and an image photographing method for generating a synthesis image from a plurality of images obtained through a plurality of photographing units.

Description of the Related Art

Various types of electronic products have been developed and released with developments in electronic technologies. In particular, various photographing apparatuses such as televisions (TVs), cellular phones, personal computers (PCs), notebook PCs, personal digital assistants (PDAs), etc., are widely used in general homes.

User demand for a greater variety of functions has also increased because of an increase in use of photographing apparatuses. Accordingly, efforts of manufacturers have also increased to meet user demands, and thus products with new functions have appeared one after another.

In particular, recently developed smart phones or tablet PCs often include a plurality of cameras. These devices include cameras on front and rear surfaces thereof to provide convenience during self-photographing or a video conversation.

However, although a unifocal lens is used in consideration of portability and weight of a smart phone or a tablet PC, if a user uses a zooming function during photographing, digital zooming is implemented due to an optical restriction of the unifocal lens.

When such digital zooming is used to expand a magnification, noise occurs, which problematically deteriorates image quality.

Accordingly, a demand for obtaining an image having a good image quality and an expanded magnification by using a plurality of cameras has increased.

SUMMARY

Aspects of one or more exemplary embodiments overcome the above disadvantages and other disadvantages not described above. Also, an exemplary embodiment is not required to overcome the disadvantages described above, and an exemplary embodiment may not overcome any of the problems described above.

Aspects of one or more exemplary embodiments provide an image photographing apparatus and an image photographing method for generating a synthesis image from a plurality of images in realizing a zooming function by using a plurality of photographing units.

According to an aspect of an exemplary embodiment, there is provided an image photographing apparatus including: a plurality of image capturers respectively comprising lenses having different focal distances and respectively configured to capture a plurality of images having different resolutions; a storage configured to store the plurality of images captured by the plurality of image capturers; an image processor configured to adjust properties of the plurality of images to correspond to each other; a controller configured to, in response to a magnification change command being input, control the image processor to synthesize the plurality of images of which the properties are adjusted and generate a synthesis image of a magnification changed according to the magnification change command; and a display configured to display the synthesis image.

The controller may be configured to control the image processor to detect each of local regions of a size corresponding to the changed magnification from the plurality of images and to synthesize the detected local regions to generate the synthesis image.

The controller may be configured to synchronize timing of a reset signal provided to each of image sensors included in the plurality of image capturers and to synchronize capturing timing of the plurality of image capturers.

The controller may be configured to determine whether to synchronize the plurality of images based on a common region included in the plurality of images, and to, if the plurality of images are in an asynchronous state, perform delay processing on at least one image frame and synchronize the plurality of images.

The controller may be configured to determine whether to synchronize the plurality of images based on a common region included in the plurality of images, and to, if the plurality of images are in an asynchronous state, synchronize capturing timing of the plurality of image capturers.

The controller may be configured to adjust a synthesis rate of each of the plurality of images based on a movement degree of a subject in a common region included in the plurality of images.

The properties of the plurality of images may include a color and a white balance; and the controller may be configured to adjust colors and white balances of an image, among the plurality of images, according to a color and a white balance of another image, among the plurality of images.

The plurality of image capturers may include a first image capturer including a wide angle lens and at least one second image capturer including a telephoto lens; and the controller may be configured to adjust a color and a white balance of at least one second image obtained from the at least one second image capturer according to a color and a white balance of a first image obtained from the first image capturer.

The plurality of image capturers may respectively further include image sensors with color pixels having a same pattern or different patterns; and the controller may be configured to generate the synthesis image expressing a physical property of a subject based on a plurality of color spectrum information obtained from the image sensors including the color pixels having the same pattern or the different patterns.

At least one image sensor, among the image sensors, may include a pixel detecting depth information of the subject; and the controller may be configured to generate a three-dimensional (3D) image of the changed magnification based on the detected depth information.

The controller may be configured to output, for display, an indicator that indicates a plurality of regions having different resolutions included in the synthesis image of the magnification changed according to the magnification change command, and to, in response to a user command being input with respect to the indicator, display at least one of the plurality of images corresponding to each of the plurality of regions.

The lenses included in the plurality of image capturers may face in different directions; the image processor may be configured to perform at least one of calibration and rectification on a difference generated by the different directions of the lenses and to modify the plurality of images as images captured when the lenses face in the same direction; and the controller may be configured to control the image processor to connect and synthesize the modified images and generate a single whole image.

According to an aspect of another exemplary embodiment, there is provided an image photographing method performed by an image photographing apparatus including a plurality of image capturers using lenses having different focal distances, the method including: storing a plurality of images having different resolutions captured by the plurality of image capturers; adjusting properties of the plurality of images to correspond to each other; in response to a magnification change command being input, synthesizing the plurality of images of which the properties are adjusted to generate a synthesis image of a magnification changed according to the magnification change command; and outputting the synthesis image.

The generating the synthesis image may include detecting each of local regions of a size corresponding to the changed magnification from the plurality of images and synthesizing the detected local regions to generate the synthesis image.

The image photographing method may further include synchronizing timing of a reset signal provided to each of image sensors included in the plurality of image capturers and synchronizing capturing timing of the plurality of image capturers.

The image photographing method may further include determining whether to synchronize the plurality of images based on a common region included in the plurality of images, and, if the plurality of images are in an asynchronous state, performing delay processing on at least one image frame and synchronizing the plurality of images.

The image photographing method may further include determining whether to synchronize the plurality of images based on a common region included in the plurality of images, and, if the plurality of images are in an asynchronous state, synchronizing capturing timing of the plurality of image capturers.

The generating the synthesis image may include adjusting a synthesis rate of each of the plurality of images based on a movement degree of a subject in a common region included in the plurality of images.

The properties of the plurality of images may include a color and a white balance; and the adjusting may include adjusting colors and white balances of an image, from among the plurality of images, according to a color and a white balance of another image, among the plurality of images.

The plurality of image capturers may include a first image capturer including a wide angle lens and at least one second image capturer including a telephoto lens; and the adjusting may include adjusting a color and a white balance of at least one second image obtained from the at least one second image capturer according to a color and a white balance of a first image obtained from the first image capturer.

According to an aspect of another exemplary embodiment, there is provided an image photographing apparatus including: a plurality of image capturers respectively configured to capture a plurality of images having different resolutions; and a controller configured to, in response to a magnification change command being input, control the image processor to synthesize the plurality of images of which the properties are adjusted and generate a synthesis image of a magnification changed according to the magnification change command.

The image photographing apparatus may further include an image processor, wherein the controller may be configured to control the image processor to detect each of local regions of a size corresponding to the changed magnification from the plurality of images and to synthesize the detected local regions to generate the synthesis image.

The controller may be configured to synchronize timing of a reset signal provided to each of image sensors included in the plurality of image capturers and to synchronize capturing timing of the plurality of image capturers.

The controller may be configured to determine whether to synchronize the plurality of images based on a common region included in the plurality of images, and to, if the plurality of images are in an asynchronous state, perform delay processing on at least one image frame and synchronize the plurality of images.

The controller may be configured to determine whether to synchronize the plurality of images based on a common region included in the plurality of images, and to, if the plurality of images are in an asynchronous state, synchronize capturing timing of the plurality of image capturers.

The controller may be configured to adjust a synthesis rate of each of the plurality of images based on a movement degree of a subject in a common region included in the plurality of images.

The image photographing apparatus may further include an image processor configured to adjust properties of the plurality of images to correspond to each other; wherein the properties of the plurality of images may include a color and a white balance, and wherein the controller may be configured to adjust colors and white balances of an image, among the plurality of images, according to a color and a white balance of another image, among the plurality of images.

The plurality of image capturers may include a first image capturer including a wide angle lens and at least one second image capturer including a telephoto lens; and the controller may be configured to adjust a color and a white balance of at least one second image obtained from the at least one second image capturer according to a color and a white balance of a first image obtained from the first image capturer.

The plurality of image capturers may respectively include image sensors with color pixels having a same pattern or different patterns; and the controller may be configured to generate the synthesis image expressing a physical property of a subject based on a plurality of color spectrum information obtained from the image sensors including the color pixels having the same pattern or the different patterns.

At least one image sensor, among the image sensors, may include a pixel detecting depth information of the subject; and the controller may be configured to generate a three-dimensional (3D) image of the changed magnification based on the detected depth information.

The controller may be configured to output, for display, an indicator that indicates a plurality of regions having different resolutions included in the synthesis image of the magnification changed according to the magnification change command, and to, in response to a user command being input with respect to the indicator, display at least one of the plurality of images corresponding to each of the plurality of regions.

The image photographing apparatus may further include: an image processor, wherein the plurality of image capturers may respectively include lenses that face in different directions, wherein the image processor may be configured to perform at least one of calibration and rectification on a difference generated by the different directions of the lenses and to modify the plurality of images as images captured when the lenses face in the same direction; and wherein the controller may be configured to control the image processor to connect and synthesize the modified images and generate a single whole image.

According to an aspect of another exemplary embodiment, there is provided an image processing apparatus including: an image processor configured to adjust properties of a plurality of images to correspond to each other, the plurality of images having different resolutions and respectively obtained from a plurality of image capturers having different focal distances; and a controller configured to, in response to a magnification change command being input, control the image processor to synthesize the plurality of images of which the properties are adjusted and generate a synthesis image of a magnification changed according to the magnification change command.

According to an aspect of another exemplary embodiment, there is provided a non-transitory computer readable recording medium having recorded thereon a program executable by a computer for performing the above method.

Additional and/or other aspects and advantages will be set forth in part in the description which follows and, in part, will be obvious from the description, or may be learned by practice of exemplary embodiments.

BRIEF DESCRIPTION OF THE DRAWINGS

The above and/or other aspects will be more apparent by describing exemplary embodiments with reference to the accompanying drawings, in which:

FIG. 11 is a diagram of color pixels of different patterns according to an exemplary embodiment;

DETAILED DESCRIPTION OF EXEMPLARY EMBODIMENTS

Figure 1:
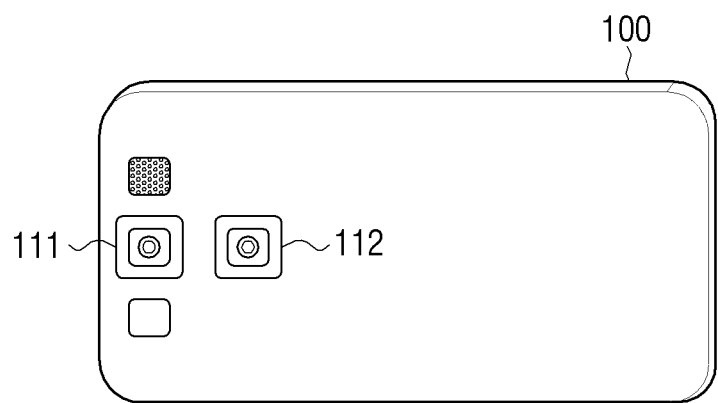
FIG. 1 is a diagram of an image photographing apparatus according to an exemplary embodiment.

Exemplary embodiments may be diversely modified. Accordingly, specific exemplary embodiments are illustrated in the drawings and are described in detail in the detailed description. The matters defined in the description, such as detailed construction and elements, are provided to assist in a comprehensive understanding of the present inventive concept(s). Thus, it is apparent that exemplary embodiments can be carried out without those specifically defined matters. Also, well-known functions or constructions are not described in detail since they would obscure exemplary embodiments with unnecessary detail. Hereinafter, it is understood that expressions such as "at least one of," when preceding a list of elements, modify the entire list of elements and do not modify the individual elements of the list.

FIG. 1 is a diagram of an image photographing apparatus 100 according to an exemplary embodiment.

Referring to FIG. 1, the image photographing apparatus 100 includes two photographing units 111 and 112 (e.g., cameras, image capturers, etc.) in its rear surface. Accordingly, the image photographing apparatus 100 may obtain two images by performing photographing through the two photographing units 111 and 112 with respect to a same subject, and may generate a synthesis image by processing the obtained two images.

Meanwhile, although two photographing units 111 and 112 are illustrated in FIG. 1, it is understood that one or more other exemplary embodiments are not limited thereto, and more than two photographing units may be included. That is, a structure of the image photographing apparatus 100 is not limited thereto and may vary in other exemplary embodiments. This will be described in detail below.

Figure 2:
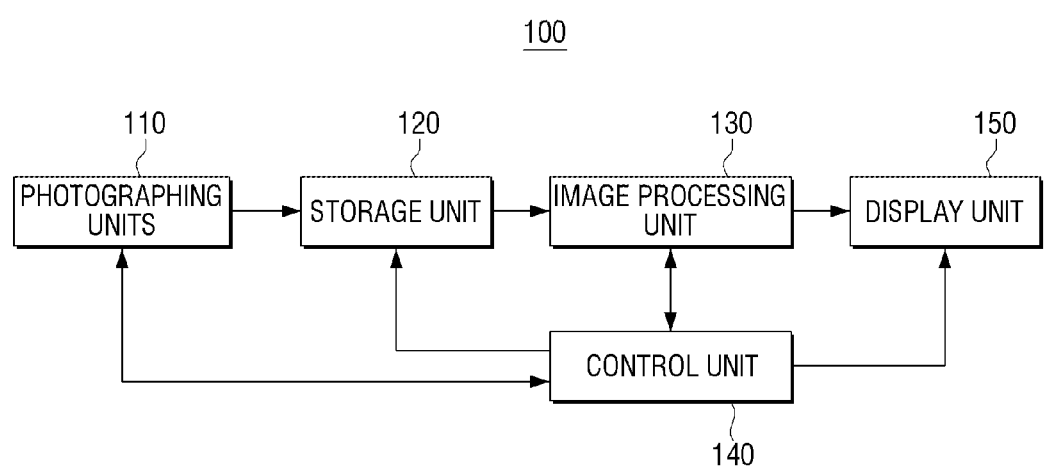
FIG. 2 is a block diagram of a configuration of an image photographing apparatus according to an exemplary embodiment.

FIG. 2 is a block diagram of a configuration of the image photographing apparatus 100 according to an exemplary embodiment.

Referring to FIG. 2, the image photographing apparatus 100 includes a plurality of photographing units 110, a storage unit 120 (e.g., storage), an image processing unit 130 (e.g., image processor), a control unit 140 (e.g., controller), and a display unit 150 (e.g., display). In this regard, the image photographing apparatus 100 may be implemented as various types of electronic apparatuses such as a television (TV), an electronic board, an electronic table, a large format display (LFD), a smart phone, a tablet, a desktop personal computer (PC), a notebook, a netbook, a portable multimedia player (PMP), a digital camera, etc.

The plurality of photographing units 110 include lenses of different focal distances and photograph images having different resolutions. The shorter the focal distance, the smaller the aperture value, such that an amount of incident light increases, thereby obtaining an image of a bright quality. The longer the focal distance, the greater the aperture value, such that the amount of incident light is reduced, thereby obtaining an image of a dark quality.

A lens having a short focal distance is referred to as a wide-angle lens. A lens having a long focal distance is referred to as a telephoto lens. In this regard, an image obtained from the wide-angle lens is defined as a wide image, and an image obtained from the telephoto lens is defined as a tele image. Images obtained through lenses having different focal distances have different resolutions.

In more detail, the plurality of photographing units 110 may include the lenses, a shutter, an aperture, a solid imaging device, an analog front end (AFE), a timing generator (TG), and an image sensor. The shutter adjusts a time during which light reflected from a subject passes to the image sensor. The aperture adjusts an amount of light incident on to a lens by mechanically increasing or reducing a size of an opening into which the light comes. If the light reflected from the subject is accumulated as a photo charge, the solid imaging device outputs an image by the photo charge as an electrical signal. The TG outputs a timing signal for reading out pixel data of the solid imaging device. The AFE samples and digitizes the electrical signal output from the solid imaging device. A detailed description of each element will be provided below.

The storage unit 120 stores a plurality of images photographed by the plurality of photographing units 110. The storage unit 120 may be implemented as a storage medium such as a non-volatile memory (for example, a flash memory and an electrically erasable read-only memory (EEROM)), a hard disk, etc. The storage unit 120 may provide the plurality of stored images to the image processing unit 130.

The image processing unit 130 adjusts properties of the plurality of images to correspond to each other. In more detail, the image processing unit 130 may process raw image data photographed by the plurality of photographing units 110 to generate YCbCr data. The image processing unit 130 determines an image black level and adjusts a sensitivity rate for each color. In addition, the image processing unit 130 adjusts a white balance and performs gamma correction, color interpolation, color correction, and resolution conversion. In particular, the image processing unit 130 may adjust color correction and white balance on the plurality of images photographed by the plurality of photographing units 110 to allow the properties of the plurality of images to be the same.

The control unit 140 controls a general operation of the image photographing apparatus 100. The control unit 140 controls the plurality of photographing units 110 to obtain raw image data and controls the image processing unit 130 to display a live view image on the display unit 150. If a photographing command such as pressing of a shutter is received, the control unit 140 performs image processing on the raw image data to generate a still image. In a moving image photographing mode, the control unit 140 controls the image processing unit 130 to generate a moving image.

In particular, if a magnification change command is input, the control unit 140 may control the image processing unit 130 to synthesize the plurality of images of which properties are adjusted and generate a synthesis image of a magnification changed according to the magnification change command. In this regard, the magnification may include a photographing magnification during photographing, and may include a magnification to expand or reduce a displayed image when a photographed image is displayed through the display unit 150. The photographing magnification refers to a magnification of the live view image displayed through the display unit 150 during photographing.

In more detail, if the magnification change command is input while displaying the live view image on the display unit 150, the control unit 140 may synthesize the plurality of images of which properties are adjusted and generate and display the synthesis image of the magnification changed according to the magnification change command. If a command for expanding or reducing the photographed image displayed through the display unit 150, i.e., for changing the magnification during reproduction of an image, is input, the control unit 140 may synthesize the plurality of images of which properties are adjusted and generate and display a synthesis image corresponding to a changed photographing magnification.

The display unit 150 may display the synthesis image. To this end, the display unit 150 may be implemented as a liquid crystal display (LCD), an organic light emitting display (OLED), an active-matrix OLED (AMOLED), a plasma display panel (PDP), etc.

Figure 3:
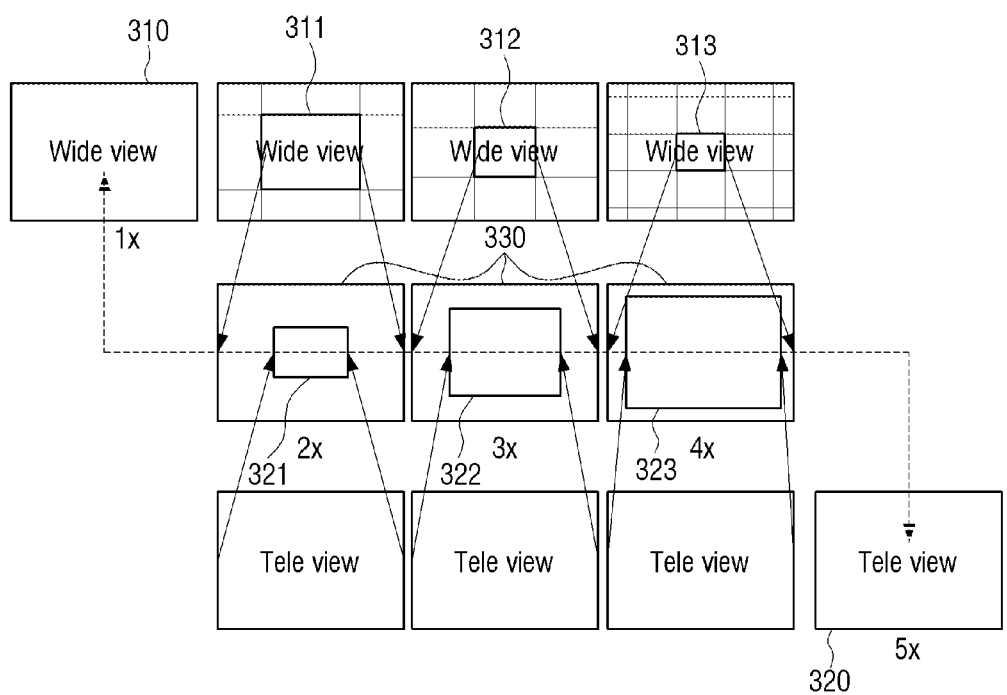
FIG. 3 is a diagram for explaining a process of generating a synthesis image of a magnification changed by a magnification change command according to an exemplary embodiment.

FIG. 3 is a diagram for explaining a process of generating a synthesis image corresponding to a changed photographing magnification according to an exemplary embodiment.

FIG. 3 shows a process of generating the synthesis image corresponding to the changed photographing magnification from an image obtained from each of the plurality of photographing units 110 in a case where the plurality of photographing units 110 include a 1× magnification lens and a 5× magnification lens.

The control unit 140 may control the image processing unit 130 to detect each of local regions of a size corresponding to the changed photographing magnification from the plurality of images and synthesize the detected local regions to generate the synthesis image.

For example, if a 1× magnification image obtained from the photographing unit 110 including the 1× magnification lens is a wide view image 310, and a 5× magnification image obtained from the photographing unit 110 including the 5× magnification lens is a tele view image 320, the control unit 140 controls the image processing unit 130 to detect regions corresponding to 2×, 3×, and 4× magnification sizes from the 1× magnification wide view image 310.

In more detail, the control unit 140 detects a region 311 corresponding to the 2× magnification size from the wide view image 310. Since a 2× magnification image is an expanded image compared to the 1× magnification image, the region 311 corresponding to the 2× magnification size is smaller than a size of the wide view image 310. The control unit 140 controls the image processing unit 130 to expand the detected region 311 corresponding to the 2× magnification size to a size of the 1× magnification image and display the expanded 1× magnification image on a full screen.

The control unit 140 may control the image processing unit 130 to downsize the 5× magnification tele view image 320 to a 2× magnification image 321. The control unit 140 may control the image processing unit 130 to synthesize the 1× magnification image expanded from the region 311 corresponding to the 2× magnification size detected from the wide view image 310 and the 2× magnification image 321 generated by downsizing the 5× magnification tele view image 320 to generate a 2× magnification synthesis image 330.

Likewise, the control unit 140 may control the image processing unit 130 to detect a region 312 corresponding to a 3× magnification size from the wide view image 310, expand the detected region 312 corresponding to the 3× magnification size to the size of the 1× magnification image, and display the expanded 1× magnification image on the full screen. The control unit 140 may control the image processing unit 130 to downsize the 5× magnification tele view image 320 to a 3× magnification image 322. The control unit 140 may control the image processing unit 130 to synthesize the 1× magnification image expanded from the region 312 corresponding to the 3× magnification size detected from the wide view image 310 and the 3× magnification image 322 generated by downsizing the 5× magnification tele view image 320 to generate the 3× magnification synthesis image 330.

Similarly, the control unit 140 may control the image processing unit 130 to detect a region 313 corresponding to a 4× magnification size from the wide view image 310, expand the detected region 313 corresponding to the 4× magnification size to the size of the 1× magnification image, and display the expanded 1× magnification image on the full screen. The control unit 140 may control the image processing unit 130 to downsize the 5× magnification tele view image 320 to a 4× magnification image 323. The control unit 140 may control the image processing unit 130 to synthesize the 1× magnification image expanded from the region 313 corresponding to the 4× magnification size detected from the wide view image 310 and the 4× magnification image 323 generated by downsizing the 5× magnification tele view image 320 to generate the 4× magnification synthesis image 330.

In this regard, the 1× magnification images generated by expanding the regions 311, 312, and 313 corresponding to the 2×, 3×, and 4× magnification sizes detected from the wide view image 310 and the 2×, 3×, and 4× magnification images 321, 322, and 323 generated by downsizing the tele view image 320 have different resolutions. In more detail, since the 2×, 3×, and 4× magnification images 321, 322, and 323 generated by downsizing the tele view image 320 are reductions of the 5× magnification image, the 2×, 3×, and 4× magnification images 321, 322, and 323 have relatively high resolutions compared to the 1× magnification images generated by expanding the regions 311, 312, and 313 corresponding to the 2×, 3×, and 4× magnification sizes detected from the wide view image 310.

Thus, the 2×, 3×, and 4× magnification synthesis images 330 include all of the 1× magnification images generated by expanding the regions 311, 312, and 313 corresponding to the 2×, 3×, and 4× magnification sizes detected from the wide view image 310 and the 2×, 3×, and 4× magnification images 321, 322, and 323 generated by downsizing the tele view image 320.

Accordingly, when a user zooms in or out the 2×, 3×, and 4× magnification images 321, 322, and 323 generated by downsizing the tele view image 320, the 2×, 3×, and 4× magnification images 321, 322, and 323 may be expanded while maintaining high resolutions up to 5× magnification.

An operation of generating and displaying the synthesis images 330 including regions including different resolutions may be applied to both a case when a change command for changing a photographing magnification while displaying a live view image is input and a case in which a command for expanding or reducing a photographed image, i.e., for changing a magnification during reproduction of an image is input as described above.

Accordingly, the user may obtain a higher resolution image compared to a case where a single photographing unit including a fixed magnification lens is used to perform digital zooming and to photograph or reproduce an image.

Figure 4A:
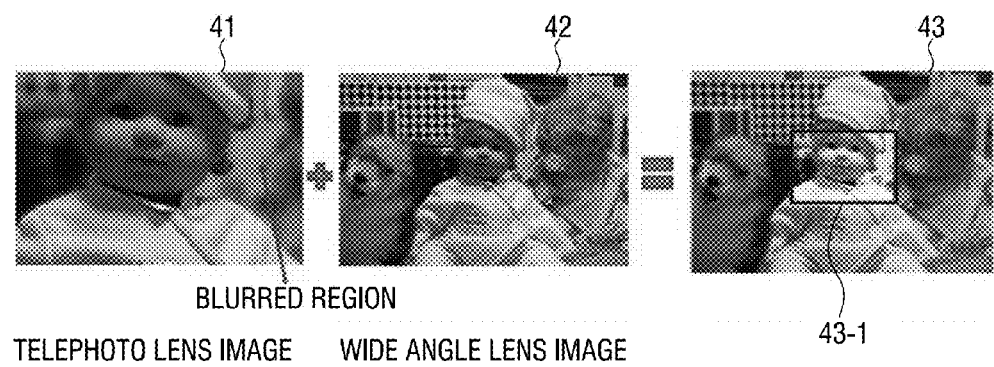
FIGS. 4A and 4B are diagrams for explaining an effect of a synthesis image according to one or more exemplary embodiments.
Figure 4B:
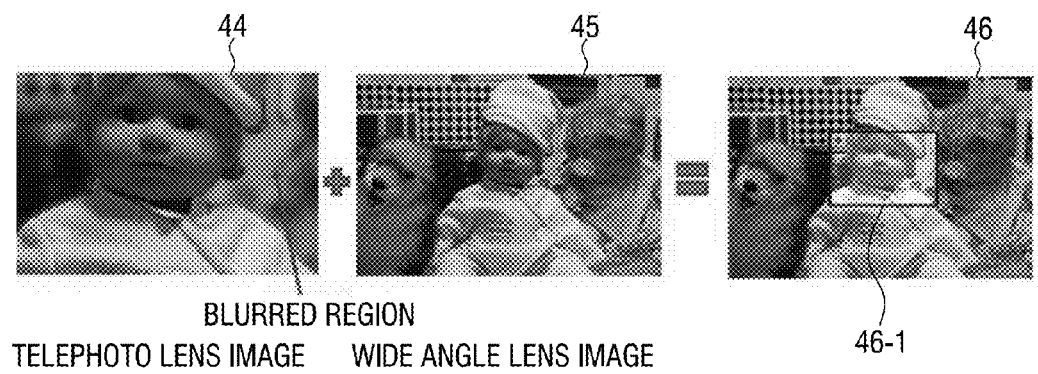

FIGS. 4A and 4B are diagrams for explaining an effect of a synthesis image according to one or more exemplary embodiments.

Referring to FIG. 4A, a synthesis image 43 indicating an outfocusing effect is generated by synthesizing a telephoto lens image 41 and a wide angle lens image 42 obtained from the plurality of photographing units 110 each including a telephoto lens and a wide angle lens.

In more detail, when a subject is photographed by using the wide angle lens, an angle of view is wide because of a short focal distance, and a fan focus effect that seems to focus an entire image because of a deep depth of field is produced. That is, an image obtained through the wide angle lens has a consistent resolution for the entire image.

In comparison, when the subject is photographed by using the telephoto lens, the angle of view is narrow because of a long focal distance, and a focused subject has a high resolution because of a shallow depth of field, whereas an out focus effect that expresses a blurring effect of blurring a background excluding the subject (e.g., bokeh effect) is produced. That is, an image obtained through the telephoto lens has different resolutions between the subject and the background excluding the subject.

For example, as shown in FIG. 4A, if the control unit 140 synthesizes the wide angle lens image 42 having the fan focus effect and the telephoto lens image 41 having the out focus effect with respect to the wide angle lens image 42, the synthesis image 43 having the out focus effect by blurring a periphery of the subject included in the wide angle lens image 42 is generated. That is, in this case, the control unit 140 controls to blur the periphery of the subject included in the wide angle lens image 42.

A square region 43-1 of the synthesis image 43 is a region (e.g., synthesis region) in which the telephoto lens image 41 is synthesized to the wide angle lens image 42. A region of the subject having a higher resolution of the telephoto lens image 41 and a blurred region of the periphery of the subject of the telephoto lens image 41 are synthesized in the square region 43-1, and thus the out focus effect is produced.

In this regard, the square region 43-1 in which the telephoto lens image 41 is present may have various shapes excluding a square, and may have a polygonal shape like an arbitrary cogwheel by avoiding a main edge component of the subject for a natural synthesis of the telephoto lens image 41 and the wide angle lens image 42.

Since a resolution of the synthesized telephoto lens image 41 is higher than that of the wide angle lens image 42, when photographing or reproduction is performed on the square region 43-1 of the synthesis image 43, although magnification is expanded, the telephoto lens image 41 may be displayed while maintaining a high resolution. However, the blurred region corresponds to an intentional blurring effect for the out focus effect, and thus a resolution of the blurred region is low, and a resolution of the focused subject is increased.

As shown in FIG. 4B, if the control unit 140 synthesizes a wide angle lens image 45 having the fan focus effect and a telephoto lens image 44 having the out focus effect, a synthesis image 46 having the fan focus effect that increases a resolution of a periphery of the blurred subject included in the telephoto lens image 41 is generated.

A square region 46-1 of the synthesis image 46 is a region (e.g., synthesis region) in which the wide angle lens image 45 is synthesized to the telephoto lens image 44. A non-blurred region of the periphery of the subject of the wide angle lens image 45 is synthesized in the square region 46-1, and thus a resolution of a blurred region of the periphery of the subject of the telephoto lens image 44 increases, thereby producing a fan focus effect.

Since a resolution of the synthesized telephoto lens image 44 is higher than that of the wide angle lens image 45, if a resolution of the blurred region of the telephoto lens image 44 is also increased by the wide angle lens image 45, an entire resolution of the telephoto lens image 44 is increased, and, when photographing or reproduction is performed, although magnification is expanded, the telephoto lens image 44 may be displayed while maintaining a high resolution.

When the user photographs the subject by using the image photographing apparatus 100 including the plurality of photographing units 110, the control unit 140 may allow the user to select the out focus effect or the fan focus effect through a live view image and provide a synthesis image by generating the synthesis image according to a selection result. When a photographed image is reproduced, the control unit 140 may allow reproduction of an image indicating the out focus effect or an image indicating the fan focus effect by synthesizing all of a plurality of photographed images.

Figure 5:
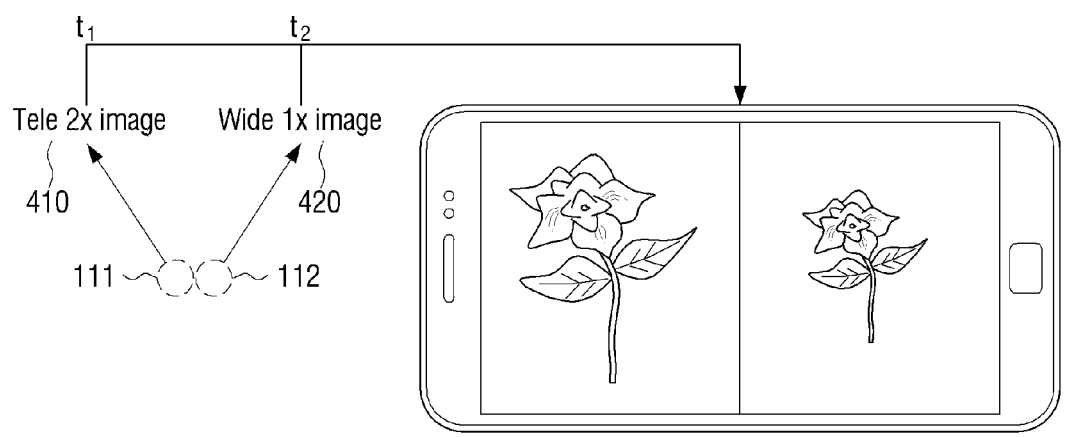
FIG. 5 is a diagram for explaining photographing timing of a plurality of photographing units according to an exemplary embodiment.

FIG. 5 is a diagram for explaining photographing timing of a plurality of photographing units 111 and 112 according to an exemplary embodiment.

Referring to FIG. 5, if it is assumed that the plurality of photographing units 111 and 112 include a 2× magnification telephoto lens and a 1× magnification wide angle lens, a tele 2× image 410 is photographed at a time t1 and obtained through the 2× magnification telephoto lens, and a wide 1× image 420 is photographed at a time t2 and obtained through the 1× magnification wide angle lens. That is, timing at which images are photographed and obtained through the 2× magnification telephoto lens and the 1× magnification wide angle lens may be different. In particular, when the subject moves or the image photographing apparatus 100 including the plurality of photographing units 111 and 112 moves, the image obtained through the 2× magnification telephoto lens and the 1× magnification wide angle lens may be images of different timing and thus different images may be obtained.

As such, when different images are synthesized to generate a synthesis image, the user may be presented with an unclear image obtained by synthesizing two different images. Accordingly, in synthesizing the images obtained from the plurality of photographing units 111 and 112, a technology of detecting and synthesizing same images obtained by photographing a same subject may be implemented.

When the image photographing apparatus 100 including the plurality of photographing units 110 moves or the subject moves (i.e., in response to detecting such movement), the control unit 140 may not synthesize a plurality of obtained images and may instead display only one of the plurality of obtained images. In this regard, the displayed image may be set according to a user's selection, a default setting, etc.

The control unit 140 may synchronize providing timing of a reset signal to each of image sensors included in the plurality of photographing units 110 and may synchronize photographing timing of the plurality of photographing units 110.

In more detail, if the control unit 140 synchronizes the timing of the reset signal provided to each of the image sensors included in the plurality of photographing units 110, a time during which an image sensor receives light, i.e., a light exposure time, is the same. If a time when light starts to come into the image sensor included in each of the plurality of photographing units 110 and a time when the light is blocked are identical, images obtained through the plurality of photographing units 110 are the same so that the control unit 140 may obtain a plurality of synchronized images through the plurality of photographing units 110. In this regard, that the obtained images are the same means that same images are obtained by photographing a same subject irrespective of a difference in the magnification.

That is, if the light exposure time is the same although the image photographing apparatus 100 including the plurality of photographing units 110 moves or the subject moves, since light reflected from the moving subject comes into each of the image sensors at the same time, the plurality of images obtained through the plurality of photographing units 110 are images regarding a same subject. Accordingly, the control unit 140 may not perform a separate synchronization operation but synthesize the plurality of obtained images to generate a synthesis image.

While the light exposure time may be controlled to be the same in the above-described exemplary embodiment, it is understood that one or more other exemplary embodiments are not limited thereto. For example, according to another exemplary embodiment, the control unit 140 may control or synchronize the timing of the reset signal provided to each of the image sensors included in the plurality of photographing units 110 so that a time during which the image sensors receive light may overlap (e.g., in a case where an exposure time, shutter speed, etc., differ between the plurality of photographing units 110). In this case, the reset signals may be provided such that the light exposure times for the respective photographing units 110 begin at a same time, end at a same time, etc.

Meanwhile, a light exposure time control of the image sensors may be performed by synchronizing the timing of the reset signal provided to the image sensors by the control unit 140 in an electronic shutter, whereas in a mecha shutter using an electronic first curtain shutter, the light exposure time control of the image sensors may be performed by synchronizing timing of an electronic front shutter (EFS) signal input after a signal for controlling an electronic first curtain.

As described above, when the light exposure time of the image sensors is not directly controlled, the control unit 140 may determine whether to synchronize obtained images according to detected movement of a subject and/or the image photographing apparatus 100, or according to detected differences between the obtained images. In more detail, the control unit 140 may determine whether to synchronize a plurality of images based on a common region included in the plurality of images.

Figure 6:
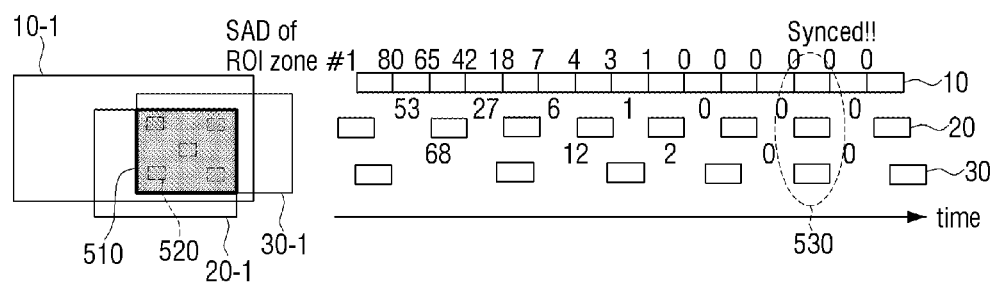
FIG. 6 is a diagram for explaining a process of determining whether to synchronize a plurality of images with each other according to an exemplary embodiment.

FIG. 6 is a diagram for explaining a process of determining whether to synchronize a plurality of images with each other according to an exemplary embodiment.

Referring to FIG. 6, the control unit 140 sets a region of interest (ROI) zone 520 with respect to a common region 510 included in a plurality of images 10-1, 20-1, and 30-1 obtained from the plurality of photographing units 110. In this regard, the ROI zone 520 is an interest region set to determine whether to synchronize the plurality of images 10-1, 20-1, and 30-1, and its size and number may be changed or vary.

The control unit 140 may determine whether to synchronize an information change according to time of pixels included in the ROI zone 520 by using a technique such as a sum of absolute difference (SAD). When the SAD technique is used, if a value of the SAD temporarily approximates to 0, the control unit 140 may determine that input images are the same and determine that the input images are synchronized.

In this regard, the SAD technique processes a digital image, which is an algorithm technique of measuring similarity between a plurality of images. The SAD technique digitizes and sums differences between pixels based on information of each corresponding pixel among pixels constituting each image, thereby measuring the similarity between the plurality of images.

In FIG. 6, images 10, 20, and 30 that are time serially obtained from three photographing units are arranged. Photographing timings of the three photographing units are different, and thus the control unit 140 may determine that the images 10-1, 20-1, and 30-1 are synchronized at a time 530 when a value of the SAD measured is 0 based on the ROI zone 520 in the common region 510 set between the images 10-1, 20-1, and 30-1. Thus, the control unit 140 may synthesize a plurality of images corresponding to a time that is determined that the plurality of images are synchronized without having to separately synchronize the plurality of images, generate a synthesis image, and display or output the synthesis image.

However, since the value of the SAD of the images 10, 20, and 30 obtained from the three photographing units in time regions other than the time 530 when the value of the SAD is 0 is not close to 0 and is not the same, the control unit 140 determines that the plurality of images are in an asynchronous state for each time. When it is determined that the plurality of images are in the asynchronous state for each time, the control unit 140 may delay processing and synchronize at least one image frame for each time.

Figure 7:
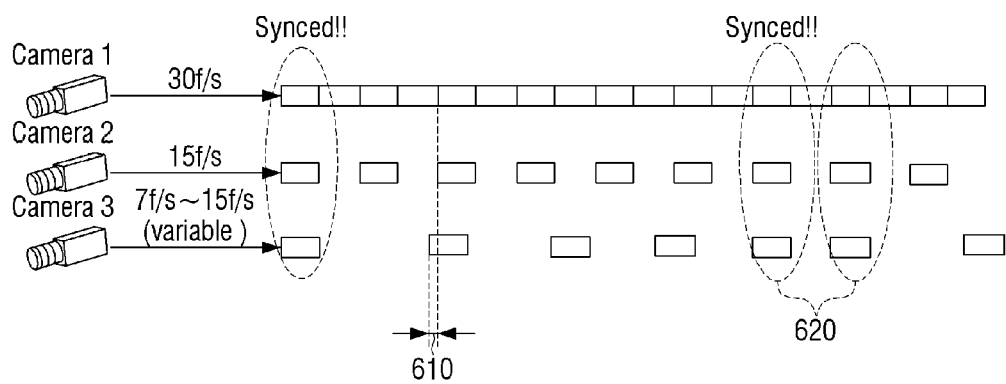
FIG. 7 is a diagram for explaining a process of synchronizing images in an asynchronous state according to an exemplary embodiment.

FIG. 7 is a diagram for explaining a process of synchronizing images in an asynchronous state according to an exemplary embodiment.

FIG. 7 illustrates a plurality of images obtained from a photographing unit 1 that photographs 30 frames over 1 second, a plurality of images obtained from a photographing unit 2 that photographs 15 frames over 1 second, and a plurality of images obtained from a photographing unit 3 that variably photographs 7-15 frames over 1 second.

When it is determined that the plurality of images obtained from the photographing units 1, 2, and 3 are synchronized (620), the control unit 140 synthesizes the images to generate and display a synthesis image. When it is determined that the plurality of images obtained from the photographing units 1, 2, and 3 are not synchronized, if the control unit 140 synthesizes the images to generate a synthesis image, different image are synthesized to generate an unclear image.

Accordingly, the control unit 140 may determine a relative delay time of photographing timing between input images, delay processing, and synchronize an image frame photographed at relatively fast photographing timing. For example, in FIG. 6, images obtained by the photographing units 1 and 2 have the same timing whereas an image obtained by the photographing unit 3 is an image obtained at variable timing, and thus the image may have fast or slow photographing timing.

The control unit 140 may determine a delay time 610 of a photographing timing of the photographing unit 3 based on the photographing unit 1 or 2, delay processing an image frame photographed at the relatively fast photographing timing obtained by the photographing unit 3 by the determined delay time 610, and synchronize and synthesize the image frame and the image obtained by the photographing unit 1 or 2.

Meanwhile, the control unit 140 may determine whether to synchronize the plurality of images based on a common region included in the plurality of images, and, if the plurality of images are in the asynchronous state, synchronize photographing timing of each of a plurality of photographing units.

In more detail, when it is difficult to synchronize the plurality of images by delay processing the image frame of FIG. 7 as a result of determining whether to synchronize the plurality of images based on the ROI zone 520 set with respect to the common region 510 included in the plurality of images obtained through the plurality of photographing units 110 as described with reference to FIG. 6, the control unit 140 may transmit a photographing timing control signal to each of the plurality of photographing units 110 to make the photographing timing signals identical to each other.

Meanwhile, the control unit 140 may adjust a synthesis ratio of each of the plurality of images based on a movement degree of a subject in a common region included in the plurality of images.

Figure 8:
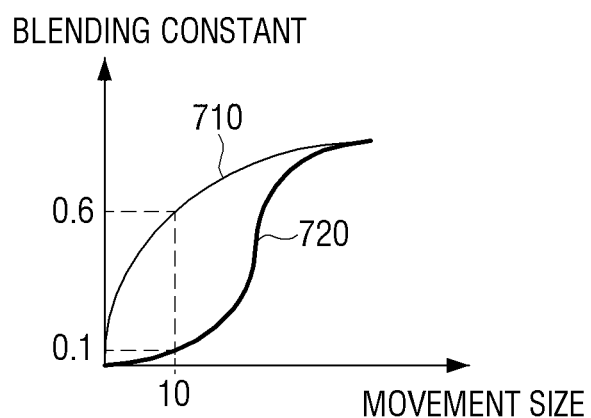
FIG. 8 is a graph illustrating a synthesis ratio according to an exemplary embodiment.

FIG. 8 is a graph illustrating a synthesis ratio according to an exemplary embodiment.

Referring to FIG. 8, a horizontal axis indicates a movement size of a subject or the image photographing apparatus 100 including the plurality of photographing units 110, and a vertical axis indicates a synthesis ratio between a plurality of images obtained through the plurality of photographing units 110. Graphs 710 and 720 illustrate a relationship between the movement size and the synthesis ratio, and indicate different synthesis ratios with respect to a same movement size.

For example, when the movement size is 10, the synthesis ratio is 0.6 according to the first graph 710, and thus the control unit 140 may synthesize one of images obtained through the plurality of photographing units 110 and other images by adjusting a synthesis ratio of the one image as 0.6 and a synthesis ratio of the other images as 0.4.

When the movement size is 10, the synthesis ratio is 0.1 according to the second graph 720, and thus the control unit 140 may synthesize one of images obtained through the plurality of photographing units 110 and other images by adjusting a synthesis ratio of the one image as 0.1 and a synthesis ratio of the other images as 0.9.

That is, the control unit 140 may adjust the synthesis ratio of each of the plurality of images obtained through the plurality of photographing units 110, even though the subject moves or the image photographing apparatus 100 moves, synthesize images having no distortion, and display the synthesized image.

Meanwhile, an example is described that when the image photographing apparatus 100 including the plurality of photographing units 110 moves or the subject moves, the control unit 140 stops synthesizing the plurality of obtained images and displays only one of the plurality of obtained images. In such an exemplary embodiment, referring to FIG. 8, when the movement size is very high, the synthesis ratio is 1, and thus the control unit 140 may synthesize one of images obtained through the plurality of photographing units 110 and other images by adjusting a synthesis ratio of the one image as 1 and a synthesis ratio of the other images as 0.

As described above, the control unit 140 may generate and provide a synthesis image having no distortion to a user by adjusting a synthesis ratio between a plurality of images according to a degree of the movement size of the subject or the image photographing apparatus 100. In this regard, the movement size may be calculated through at least one of a differential image between the plurality of images, a value of the SAD, and a separate movement detection unit (e.g., movement detector) such as a gyro sensor included in the image photographing apparatus 100.

Figure 9:
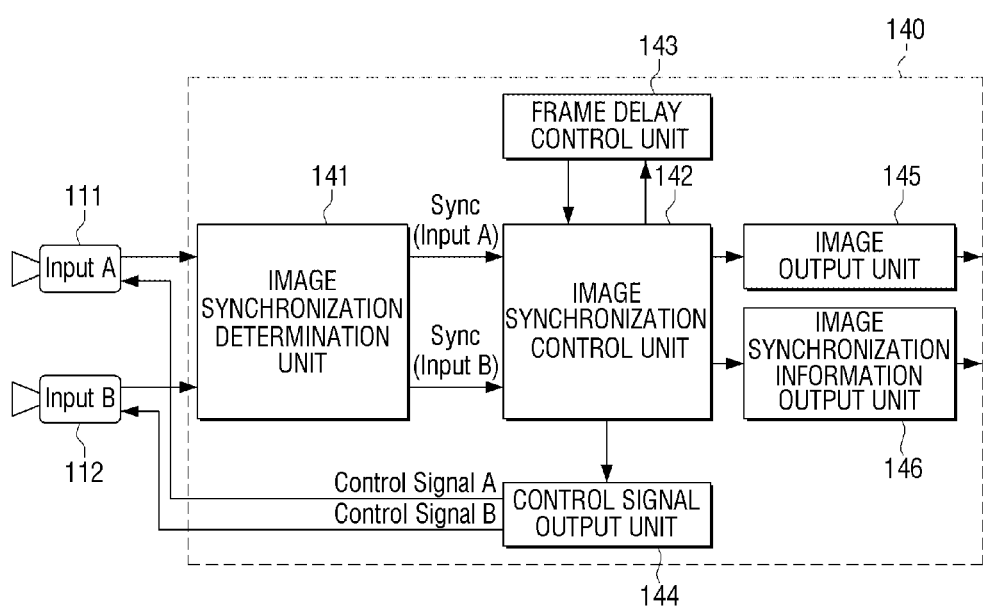
FIG. 9 is a block diagram of a detailed configuration of a control unit according to an exemplary embodiment.

FIG. 9 is a block diagram of a detailed configuration of the control unit 140 according to an exemplary embodiment.

Referring to FIG. 9, the control unit 140 may include an image synchronization determination unit 141 (e.g., image synchronization determiner), an image synchronization control unit 142 (e.g., image synchronization controller), a frame delay control unit 143 (e.g., frame delay controller), a control signal output unit 144 (e.g., control signal output device or control signal outputter), an image output unit 145 (e.g., image output device or image outputter), and an image synchronization information output unit 146 (e.g., image synchronization information output device or image synchronization information outputter).

In more detail, the image synchronization determination unit 141 determines whether to synchronize a plurality of images input from the plurality of photographing units 111 and 112. As shown in FIG. 6, the image synchronization determination unit 141 may set the ROI zone 520 with respect to the common region 510 included in the plurality of images obtained from the plurality of photographing units 111 and 112 and determine whether to synchronize an information change according to time of pixels constituting the set ROI zone 520 by using a technique such as a SAD. When the SAD is used, if it is determined that a temporal variance of the SAD is the same in each of the input images, the image synchronization determination unit 141 may determine that the plurality of images are synchronized. In this regard, the SAD technique processes a digital image, which is an algorithm technique of measuring similarity between the plurality of images. The SAD technique digitizes and sums differences between pixels based on information of each corresponding pixel among pixels constituting each image, thereby measuring the similarity between the plurality of images.

The image synchronization determination unit 141 determines whether to synchronize the plurality of images based on the measured similarity between the plurality of images and provides a result of the determination to the image synchronization control unit 142.

The image synchronization control unit 142 does not separately perform synchronization on the plurality of images corresponding to a determined time in which the plurality of images are synchronized, but directly synthesizes the plurality of images through the image output unit 145 to generate and display a synthesis image.

However, as a result of determining whether to synchronize the plurality of images based on the measured similarity between the plurality of images by the image synchronization determination unit 141, when the plurality of images are in an asynchronous state, i.e., when the variances of the SAD are different, the image synchronization control unit 142 may control the frame delay control unit 143 to delay processing and synchronize at least one image frame.

In more detail, the frame delay control unit 143 may determine a relative delay time of photographing timing between input images, delay processing, and synchronize an image frame photographed at relatively fast photographing timing.

For example, as described above with reference to FIG. 6, when photographing timings of the images obtained from the plurality of photographing units 111 and 112 are different, the frame delay control unit 143 may determine a delay time of photographing timing between the photographing units 11 and 112, and when the photographing unit 112 has relatively faster photographing timing compared to the photographing unit 111, the frame delay control unit 143 may delay processing an image frame obtained from the photographing unit 112 by the determined delay time and synchronize and synthesize the image frame and an image obtained from the photographing unit 111.

As a result of determining whether to synchronize the plurality of images based on the measured similarity between the plurality of images by the image synchronization determination unit 141, when the plurality of images are in the asynchronous state, i.e., when the variances of the SAD are different, the image synchronization control unit 142 may control the control signal output unit 144 to generate a control signal for synchronizing the photographing timing of the plurality of photographing units 111 and 112.

In more detail, as described above with reference to FIG. 7, when it is difficult to synchronize the plurality of images only by delay processing the image frame, the image synchronization control unit 142 may control the control signal output unit 144 to transmit a photographing timing control signal to each of the plurality of photographing units 111 and 112 to cause the photographing timing signals to be identical to each other.

The image synchronization information output unit 146 may output synchronization information between the plurality of images along with the synthesis image.

Meanwhile, when the plurality of images obtained from the plurality of photographing units 110 are synthesized, although only images having the same property are synthesized, a synthesis image may be displayed as one image having one property. Adjustment of properties of the plurality of obtained images will now be described.

A property of an image according to an exemplary embodiment may include at least one of a color and a white balance, although it is understood that one or more other exemplary embodiments are not limited thereto. For example, the property of the image may also include at least one of sharpness, contrast, International Standards Organization (ISO) sensitivity, etc.

The control unit 140 may adjust colors and white balances of other images of the plurality of images in the same manner with respect to a color and a white balance of one of the plurality of images.

In general, a color temperature of a light source is predicted by analyzing a photographed image so as to adjust the color and the white balance. In this regard, the control unit 140 adjusts the color and the white balance through a process of adjusting gain values of each color channel of red (R), green (G), and blue (B) by extracting a value of regions determined as a grey color from an image signal. However, in this case, it may be difficult to find an exact matching location between the plurality of images, and thus it may be difficult to reconstruct an exact color and color noise occurs.

Accordingly, the control unit 140 according to an exemplary embodiment adjusts colors and white balances of other images of the plurality of images in the same manner with respect to the color and the white balance of one of the plurality of images. In more detail, properties of other images are adjusted based on a property of an image obtained through a wide angle lens. This will be described in detail below.

A plurality of photographing units include a first photographing unit including a wide angle lens and at least one second photographing unit including a telephoto lens. The control unit 140 may adjust a color and a white balance of at least one second image obtained from the at least one second photographing unit with respect to a color and a white balance of a first image obtained from the first photographing unit.

Meanwhile, the elements described with reference to FIG. 9 above may be implemented as hardware or as software that may be stored in a memory unit or a central processing unit (CPU) to perform the processes of the elements described above in the same manner.

Figure 10:
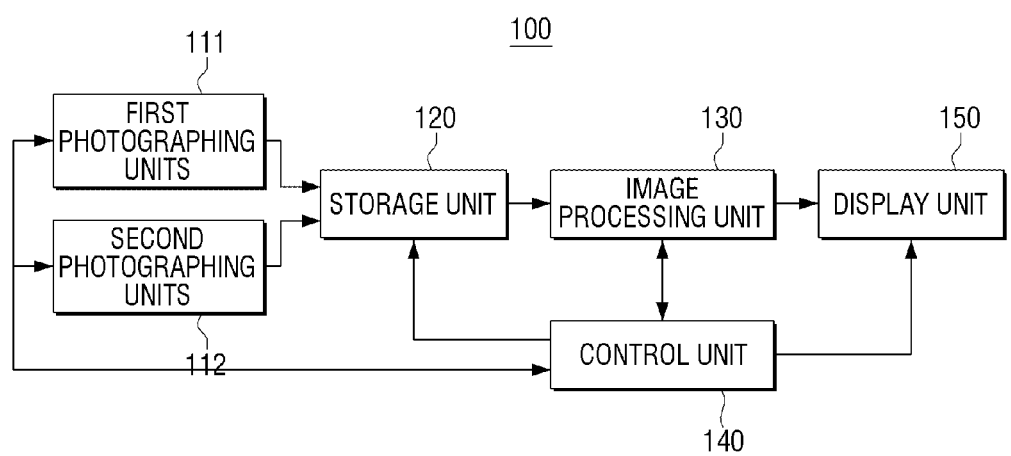
FIG. 10 is a block diagram of a configuration of an image photographing apparatus for processing a property of another image according to an exemplary embodiment.

FIG. 10 is a block diagram of a configuration of the image photographing apparatus 100 for processing a property of an image according to an exemplary embodiment.

Referring to FIG. 10, the image photographing apparatus 100 may include a first photographing unit 111 (e.g., first camera, first image capturer, etc.), a second photographing unit 112 (e.g., second camera, second image capturer, etc.), a storage unit 120 (e.g., storage), an image processing unit 130 (e.g., image processor), the control unit 140 (e.g., controller), and a display unit 150 (e.g., display). In this regard, the storage unit 120, the image processing unit 130, and the display unit 150 are described above, and thus redundant descriptions thereof are omitted.

The first photographing unit 111 is a photographing unit including a wide angle lens. The second photographing unit 112 is a photographing unit including a telephoto lens. Although only one second photographing unit 112 is illustrated in FIG. 10, the image photographing apparatus 100 may include a plurality of second photographing units 112 including telephoto lenses having different magnifications in various other exemplary embodiments.

The control unit 140 detects gray measurement information from a wide angle image obtained through the first photographing unit 111 including the wide angle lens, transmits the corresponding information to another photographing unit, i.e., the second photographing unit 112, and adjusts colors and white balances of all photographing units. That is, the wide angle lens has a short focal distance and a wide angle of view and may obtain a bright quality image so that the control unit 140 adjusts colors and white balances of photographing units including the telephoto lens based on property information of an image obtained through the wide angle lens.

Meanwhile, such an operation of adjusting properties of images may be applied to an operation of displaying an image synthesized by adjusting properties of images obtained through the plurality of photographing units 110 while displaying a live view image and an operation of displaying an image obtained by synthesizing photographed images as described above.

Although an example of adjusting a color and a white balance among properties of an image is described above, the control unit 140 may also adjust properties of the image such as sharpness, contrast, ISO, etc., in various other exemplary embodiments. In the sharpness and contrast, the control unit 140 may adjust not only properties of an image obtained from a telephoto lens based on properties of an image obtained from a wide angle lens, but also may compare the image obtained from the wide angle lens and the image obtained from the telephoto lens, select an image having better sharpness and contrast, and adjust sharpness and contrast of another image based on the selected image.

Meanwhile, an image sensor included in each of a plurality of photographing units may include color pixels of a same pattern or may include color pixels of different patterns.

FIG. 11 is a diagram of color pixels of different patterns according to an exemplary embodiment.

A CMY Bayer pattern 1110 and an RGB Bayer pattern 1120 are illustrated in FIG. 11.

In more detail, a Bayer pattern relates to an arrangement pattern of color pixels arranged in an image sensor and may be used in devices for generating a color image such as a digital camera, a camcorder, a scanner, etc.

In particular, the CMY Bayer pattern 1110 relates to an arrangement pattern of color pixels of cyan, magenta, and yellow, and the RGB Bayer pattern 1120 relates to an arrangement pattern of color pixels of red, green, and blue. In this regard, in the CMY Bayer pattern 1110, C, M, and Y present a color pixel of cyan, a color pixel of magenta, and a color pixel of yellow, respectively. In the RGB Bayer pattern 1120, R, G, and B present a color pixel of red, a color pixel of green, and a color pixel of blue, respectively.

With reference to FIG. 10, it is assumed that color pixels are configured in an image sensor of the first photographing unit 111 including a wide angle lens according to the CMY Bayer pattern 1110, and color pixels are configured in an image sensor of the second photographing unit 112 including a telephoto lens according to the RGB Bayer pattern 1120.

The control unit 140 may generate a synthesis image expressing a physical property of a subject based on a plurality of pieces of color spectrum information obtained from each of image sensors including color pixels of a same pattern or different patterns.

That is, the control unit 140 may obtain different color spectrum information of a same subject through the image sensor of the first photographing unit 111 in which the color pixels are configured according to the CMY Bayer pattern 1110 and the image sensor of the second photographing unit 112 in which the color pixels are configured according to the RGB Bayer pattern 1120, and generate the synthesis image expressing the physical property of the subject through a hyper spectral imaging technology based on the different color spectrum information. The technology of generating an image expressing the physical property of the subject based on the different color spectrum information is referred to as the hyper spectral imaging technology.

In this regard, the color pixels of different patterns are not limited to the RGB Bayer pattern 1120 and the CMY Bayer pattern 1110 in one or more other exemplary embodiments, and each image sensor may include color pixels of various patterns. Accordingly, the control unit 140 may not display an image expressing an outline and a color only of the subject, but display an image expressing the physical property of the subject.

Figure 12:
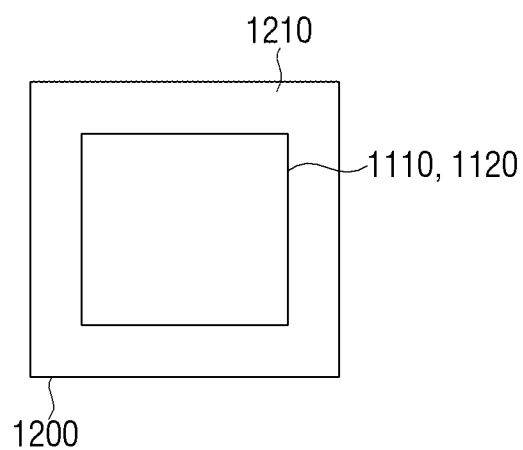
FIGS. 12 and 13 are diagrams of an image sensor including a depth sensor according to an exemplary embodiment.
Figure 13:
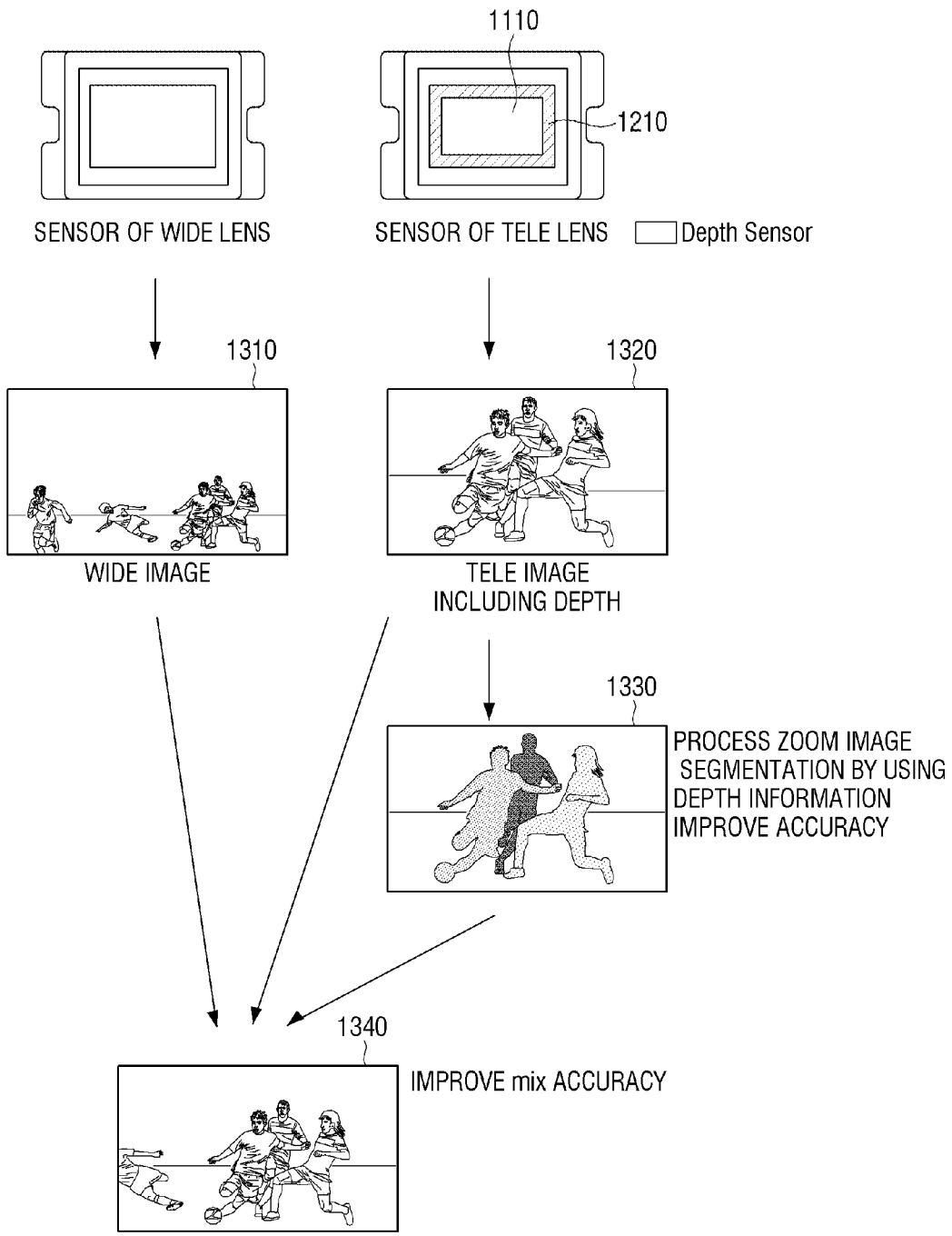

FIGS. 12 and 13 are diagrams of an image sensor 1200 including a depth sensor according to an exemplary embodiment.

Referring to FIG. 12, the image sensor 1200 may further include a pixel 1210 detecting depth information of a subject in addition to color pixels arranged according to one pattern among the plurality of different patterns 1110 and 1120. In this regard, the pixel 1210 detecting the depth information is defined as a depth sensor.

In this regard, when the pixel 1210 detecting the depth information is implemented as a discrete structure in which pixels are spaced and distributed by a uniform gap on an image sensor, a three-dimensional (3D) depth of entire input image information may be obtained, and an image of an entire image may be obtained.

When the pixel 1210 detecting the depth information is implemented as a structure in which pixels are collected in a predetermined region on the image sensor, the 3D depth of a specific region of the entire input image information may be obtained. In this case, an image of the specific region in which the pixel 1210 detecting the depth information is collected may be obtained through an image of another camera.

An example of positioning the depth sensor 1210 in an edge of the image sensor 1200 is described in FIG. 12, although it is understood that one or more other exemplary embodiments are not limited thereto.

The control unit 140 may generate a 3D image of magnification changed according to a magnification change command based on the detected depth information.

In more detail, referring to FIG. 13, an image sensor of a photographing unit including a wide angle lens among the plurality of photographing units 110 does not include a depth sensor, and an image sensor of a photographing unit including a telephoto lens includes the color pixel 1110 and the depth sensor 1210 that is the pixel detecting the depth information of the subject.

The control unit 140 may obtain a wide image 1310 from the image sensor of the photographing unit including the wide angle lens among the plurality of photographing units 110 and a tele image 1320 from the image sensor of the photographing unit including the telephoto lens. In this regard, the tele image 1320 includes not only information regarding an image, but also depth information between subjects. Accordingly, the control unit 140 may detect the depth information from the tele image 1320 including the depth information and generate a depth map 1330 mapping the detected depth information. The control unit 140 may synthesize the wide image 1310 and the tele image 1320 based on the generated depth map 1330 and may generate a 3D image 1340 of a changed photographing magnification.

Such an operation of generating the 3D image by using the depth information may be applied to both cases in which a change command for changing a photographing magnification is input while displaying a live view image as described above and in which a command for expanding or reducing a photographed image, i.e., changing a magnification while reproducing the image, is input.

Accordingly, the control unit 140 may increase liveliness while displaying a live view image implemented as a 3D image and allowing a user to view the live view image through a display unit 150 for photographing, and, if a change command for changing a photographing magnification is input while displaying the live view image, may display a synthesis image corresponding to the photographing magnification while maintaining a 3D image state.

The control unit 140 may reproduce (e.g., control to output) a two-dimensional (2D) image while reproducing a photographed image or may convert and reproduce a 3D image based on the depth information, and, if the change command for changing the photographing magnification is input while converting and reproducing the 3D image, may display a synthesis image corresponding to the photographing magnification while maintaining the 3D image state.

Figure 14:
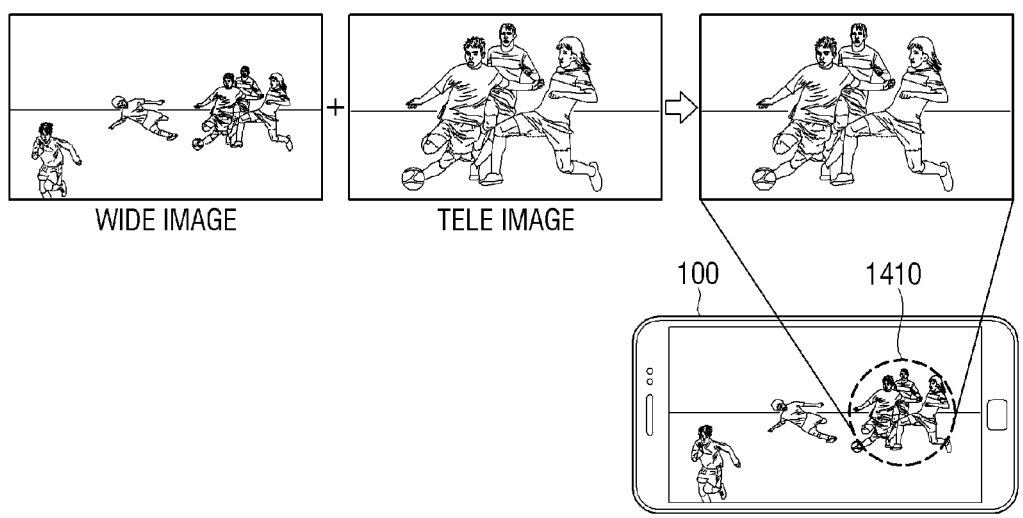
FIGS. 14 through 16 are diagrams of a user interface according to an exemplary embodiment.
Figure 15:
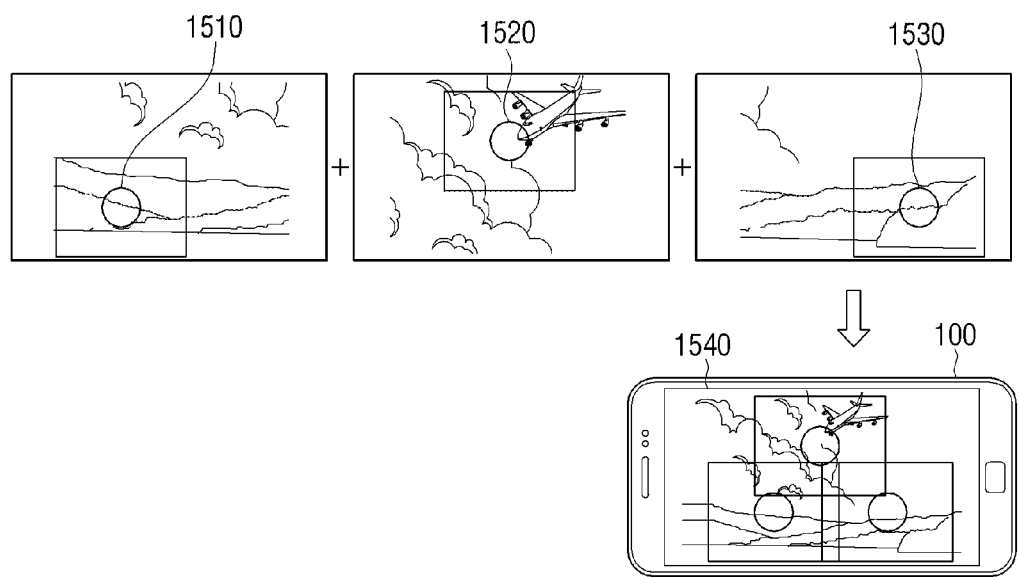
Figure 16:
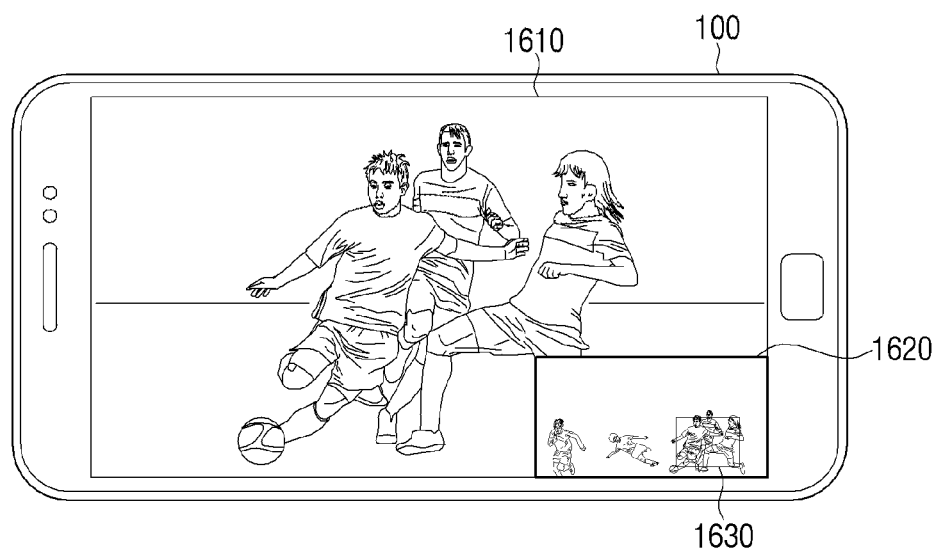

Meanwhile, FIGS. 14 through 16 are diagrams of a user interface according to one or more exemplary embodiments.

The control unit 140 may display an indicator displaying a plurality of regions having different resolutions included in a synthesis image corresponding to a changed photographing magnification, and, if a user command for the indicator is input, may display at least one of a plurality of images corresponding to each of the plurality of regions.

Referring to FIG. 14, the control unit 140 may display an indicator 1410 displaying a region including a tele image on a synthesis image of a wide image and the tele image, and, if a user command for expanding a magnification is input with respect to the indicator 1410 in the synthesis image displayed on the display unit 150, may display the tele image corresponding to the user command.

When the user inputs a command for expanding the magnification with respect to the region including the tele image, the control unit 140 may provide the tele image corresponding to the expanded magnification input by the user while maintaining a high resolution, and thus the user may view an expanded image having the high resolution.

Referring to FIG. 15, in the image photographing apparatus 100 including a plurality of photographing units providing a plurality of tele images, the control unit 140 may provide a wide image 1540 including all of tele images 1510, 1520, and 1530, and may display an indicator displaying different regions including the tele images 1510, 1520, and 1530 in the synthesized wide image 1540.

When the user inputs a command for expanding the magnification with respect to different regions including the tele images 1510, 1520, and 1530, the control unit 140 may display the tele images 1510, 1520, and 1530 corresponding to an expanded magnification input by the user while maintaining a high resolution.

Meanwhile, when the user inputs the command for expanding the magnification with respect to the operation of displaying the indicator displaying the region including the tele image on the synthesis image of the wide image and the tele image described with reference to FIGS. 14 and 15 above and the region including the tele image, the operation of providing the tele image corresponding to the expanded magnification input by the user while maintaining the high resolution may be applied to both cases in which the live view image is displayed and the photographed image is expanded or reduced, i.e., the image is reproduced.

Referring to FIG. 16, the control unit 140 may display a wide image 1620 and a synthesis image 1610 corresponding to the changed photographing magnification while displaying the live view image.

The control unit 140 may also display an indicator 1630 indicating a region of the wide image 1620 for which the synthesis image 1610 corresponding to the changed photographing magnification is displayed to allow the user to easily select a desired angle of view while maintaining the changed photographing magnification.

Meanwhile, although the case of displaying the live view image is described with reference to FIG. 16, when a command for changing a magnification is input while expanding or reducing a photographed image, i.e., reproducing an image, a wide image and a synthesis image corresponding to the changed magnification may be simultaneously displayed according to one or more other exemplary embodiments.

Figure 17:
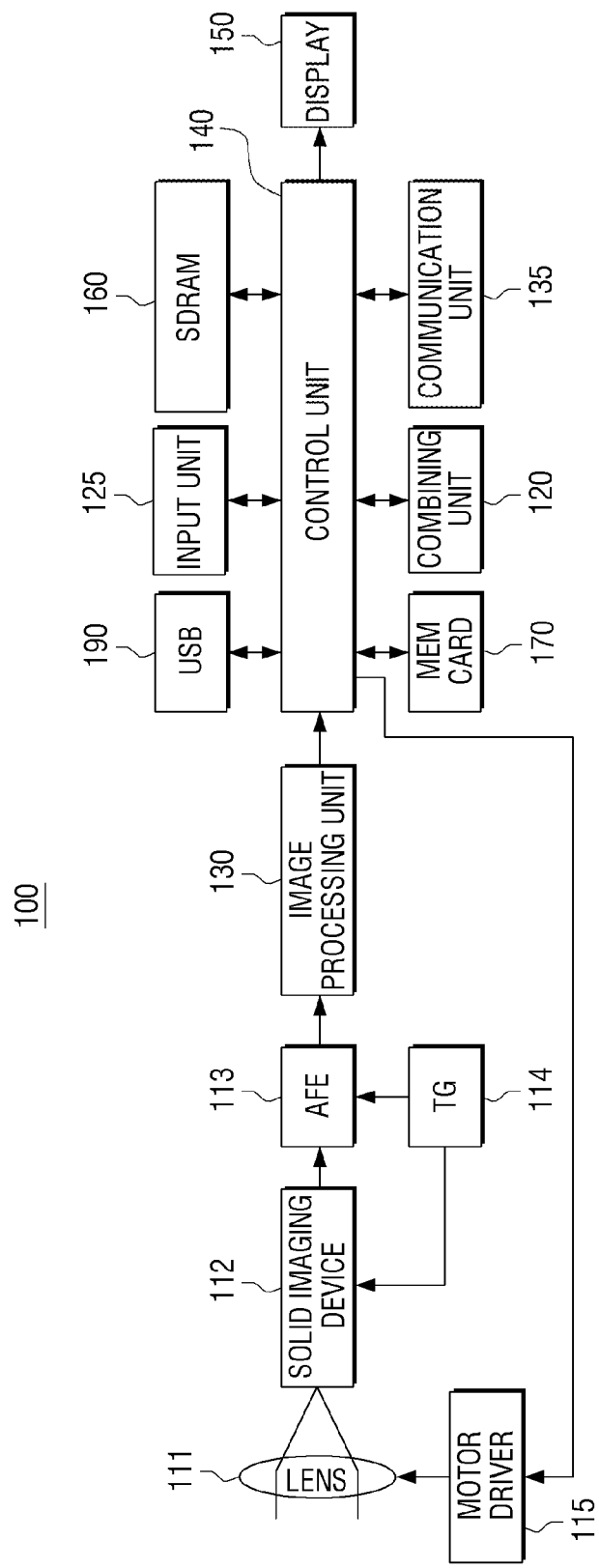
FIG. 17 is a block diagram of a configuration of a circuit of an image photographing apparatus according to an exemplary embodiment.

FIG. 17 is a block diagram of a configuration of a circuit of the image photographing apparatus 100 according to an exemplary embodiment.

Referring to FIG. 17, the image photographing apparatus 100 includes a lens 111, a solid imaging device 112, a TG 114, an analog front end (AFE) 113, a motor driver 115, a combining unit 120 (e.g., combiner), an input unit 125 (e.g., input device or inputter), an image processing unit 130 (e.g., image processor), a communication unit 135 (e.g., communicator), the control unit 140 (e.g., controller), the display unit 150 (e.g., display), a synchronous dynamic random access memory (SDRAM) module 160, a memory card 170, and a universal serial bus (USB) module 190.

The lens 111 may include a unifocal lens as an element on which light reflected from a subject is incident. Furthermore, the image photographing apparatus 100 according to an exemplary embodiment may include a plurality of lenses. Moreover, the image photographing apparatus 100 may further include an iris.

The iris is an element for adjusting an amount of light incident on to an image sensor through the lens 111. The iris has a mechanical structure capable of gradually increasing or reducing a size of an opening so as to adjust the amount of the incident light. The iris displays an opening degree by using an iris numerical value referred to as an F numerical value. The smaller the value of the iris, the wider the opening size, and thus an amount of the incident light increases, thereby generating a bright image. However, since the lens 111 according to an exemplary embodiment may be used to postulate the unifocal lens, although it may be uncommon that the value of the iris is changed, the image synchronization and property processing operations according to an exemplary embodiment may be applied by postulating only the unifocal lens, and the operations may be applied to a case in which a zoom lens is used. Thus, when the zoom lens is used, an amount of incident light may be adjusted by adjusting the value of the iris as described above.

The solid imaging device 112 is an element in which an image of the subject passes through the lens 111 and is formed. The solid imaging device 112 includes a plurality of pixels arranged in a matrix form. Each of the plurality of pixels accumulates photo charges according to the incident light and outputs an image by the photo charges as an electrical signal. The solid imaging device 112 may be configured as a complementary metal oxide semiconductor (CMOS) or a charge coupled device (CCD). The number of solid imaging devices 112 may be changed or may vary according to the number of lenses.

The solid imaging device 112 may include a photodiode PD, a transmission transistor TX, a reset transistor RX, and a floating diffusion node FD. The photo diode PD generates and accumulates photo charges corresponding to an optical image of the subject. The transmission transistor TX transmits the photo charges generated by the photo diode PD to the floating diffusion node FD in response to a transmission signal. The reset transistor RX discharges the charges stored in the floating diffusion node FD in response to a reset signal. The charges stored in the floating diffusion node FD are output before the reset signal is applied. A correlated double sampling (CDS) image sensor performs CDS processing. Then, an analog-digital converter (ADC) converts an analog signal on which CDS processing is performed into a digital signal. However, it is understood that one or more other exemplary embodiments are not limited thereto, and may implement any of numerous types of imaging devices (e.g., 2T pixels, 3T pixels, 4T pixels, 5T pixels, pseudo-CDS processing, etc.).

The TG 114 outputs a timing signal for reading out pixel data of the solid imaging device 112. The TG 114 is controlled by the control unit 140.

The AFE 113 samples and digitalizes an electrical signal on the subject output from the solid imaging device 112. The AFE 113 is controlled by the control unit 140.

However, the AFE 113 and the TG 114 may be provided as replaceable elements. In particular, when the solid imaging device 112 is implemented as a CMOS type, the AFE 113 and the TG 114 may be omitted.

The motor driver 115 drives a focusing lens and sets a focus based on information obtained by reading out phase difference pixels. However, when the first image photographing apparatus 100 is implemented as a device (e.g., a smart phone or a cellular phone in which a lens for focusing is not driven and may be processed in a software manner, the image photographing apparatus 100 may not include the motor driver 115.

The image processing unit 130 performs image processing on raw image data by the control of the control unit 140 and records the raw image data in the SDRAM 160. The image processed data of the SDRAM 160 is transferred to the display unit 150.

In auto focusing using a phase difference, the image processing unit 130 separates a signal (a signal read out from a normal pixel) for generating an image and a signal (a signal read out from a phase difference pixel) for calculating a phase difference among signals that are output from the solid imaging device 112 and sampled by the AFE 113. This is to perform quick auto focusing by generating an image like a live view image in a parallel way while calculating the phase difference quickly by using the signal for calculating the phase difference.

The image processing unit 130 processes the raw image data into YCbCr data. A pixel defect of the raw image data is primarily corrected by a correction circuit. The correction circuit corrects the pixel defect by referring to a correction table in which an address of a defective pixel is registered. Pixels around a pixel having an identical address to the address of the defective pixel are corrected.

The image processing unit 130 includes an optical black (OB) clamp circuit that determines a black level of an image. The solid imaging device 112 has an OB region, detects a signal average value of the OB region, and determines the black level through a difference of pixel values.

The image processing unit 130 performs different sensitivity rate adjustments for each color by using a sensitivity rate adjustment circuit. The sensitivity rate adjustment circuit adjusts sensitivity of R, G, and B colors under a standard light source. In general, a gain value of G is fixed to 1, and sensitivity of R and B are set to 1.

When a still image is output, image data is output through an output buffer after performing sensitivity rate adjustments. In this case, an image is generated in an interlace manner, post-processing may not be immediately performed, whereas, a live view image is output, an image is generated in a progressive manner, and thus post-processing may be immediately performed.

The image processing unit 130 performs readout on some pixel lines by using a horizontal skip readout circuit and performs skip readout on other pixel lines, and thus a pixel number of a raw image is reduced. In particular, the image photographing apparatus 100 may display a live view image in which a field of view interference occurs quickly. In this case, a photographing image may be displayed in real time by using a skip readout method.

The image processing unit 130 adjusts white balance (WB) on the image data by using a WB adjustment circuit. Since a spectrum distribution of an illumination light is different according to a photographing environment, although a white subject is photographed, an image of the white subject may not be white. A signal level is set by giving different gain values to R, G, and B pixels. In general, the gain value of G is fixed to 1, and signal levels of R and B are set to 1.

The image processing unit 130 performs gamma correction on the image data. A gradation conversion in accordance with an output of the display unit 150 is performed through gamma correction.

The image processing unit 130 generates a general color image signal configured as 3 colors per pixel from a Bayer signal configured as 1 color per pixel by using a color interpolation circuit.

A color space conversion and a color correction in accordance with an output are performed by using a color conversion/color correction circuit. A look up table (LUT) may be used as necessary. The image data is changed to the YCbCr data after the color conversion/color correction.

The image processing unit 130 converts resolution and performs resizing by using a resolution conversion circuit.

The image processing unit 130 processes a spatial filter on the image data by using a spatial filter circuit. An edge emphasis of a Y signal is performed. Low pass filter (LPF) processing of a Cb/Cr signal is performed.

The image processing unit 130 performs skip readout on the Cb/Cr signal by using a CbCr skip readout circuit and converts the image data into image data of YCbCr4:2:2. The image data is output through the output buffer and is recorded in the SDRAM 160 via a bus.

Readout may be performed on the still image in the interlace manner. In this case, since no adjacent pixel line is present, the color interpolation may not be directly processed. Thus, after preprocessing is performed, a pixel line order is adjusted through the output buffer and the image data is stored in the progressive manner in the SDRAM 160. Such image data is read again and is input in the image processing unit 130 through an input buffer.

However, it is understood that one or more other exemplary embodiments are not limited to the interlace manner with respect to the still image. The still image may be read out in the progressive manner.

Meanwhile, with respect to the still image, a preview image that is viewed as a small image after being photographed or a thumbnail image may be generated. This may be done by omitting data of some pixels like a skip readout.

The image processing unit 130 interpolates a phase difference pixel part as a general pixel value by using an AF signal interpolation circuit. Since a phase difference pixel is disposed between general pixels, when the phase difference pixel part is used as is, a resolution deterioration may occur. Thus, interpolation may be performed by using a general pixel.

According to the processing of the image processing unit 130 described above, the image processing unit 130 may adjust properties of other images among a plurality of images in the same manner based on a property of one of the plurality of images obtained through the plurality of photographing units 110 under the control of the control unit 140.

Meanwhile, the signal of the phase difference pixel separated in the separation circuit is recorded in the SDRAM 160 via a first bus. Readout and separation may be performed on all of a plurality of pixels, and thus each phase difference pixel signal is accumulated in the SDRAM 160 during a short period.

The stored phase difference pixel signal is input into the phase difference operation circuit via the first bus. The phase difference operation circuit performs a phase difference operation between phase difference pixels and calculates a movement direction and a movement amount of a focus lens. The calculated movement amount is temporarily recorded in a register included in the phase difference operation circuit and is read by the control unit 140 (e.g., a CPU).

The control unit 140 reads the calculated movement amount of the focus lens to generate a control command. The generated control command is transferred to the motor driver 115 to drive the focus lens. However, as described above, the image photographing apparatus 100 may not include the motor driver 115.

A JPEG codec may be provided to compress YCbCr data. The compressed image data is recorded in the SDRAM 160. The control unit 140 reads the compressed image data recorded in the SDRAM 160 and records the read image data in the memory card 170, and thus a process of generating an image ends.

The communication unit 135 is used to perform communication with another device. The communication unit 135 may be implemented in various wireless communication technologies. The communication unit 135 may include a local area communication module that performs direct communication without a relay device between devices. When the communication unit 135 is implemented as a wired communication module, the communication unit 135 may be included as a constituent of the combining unit 120.

The combining unit 120 may be used to couple and fix with another device and be used to perform wired communication. A case in which the combining unit 120 is used to combine with another device will be described below.

The communication unit 135 may include at least one of a WIFI direct communication module, a Bluetooth module, an infrared data association (IrDA) module, a near field communication (NFC) module, a Zigbee module, etc.

It is understood that another communication technology means or interface may be included in one or more other exemplary embodiments. For example, the communication unit 135 may include at least one of a cellular communication module, a $3^{rd}$ generation (3G) mobile communication module, a $4^{th}$ generation (4G) mobile communication module, a 4G long term evolution (LTE) communication module, etc.

The USB module 190 provides an interface with an external device. When the USB module 190 is connected to a PC or another external device through a USB cable, the USB module 190 processes transmission and reception of the image data. The USB module 190 processes firmware transmission and reception for performing a firmware upgrade.

The input unit 125 is used to receive a user input. The input unit 125 may include at least one button. The input unit 125 may include a touch screen positioned on the display unit 150. That is, the input unit 125 may receive a touch input for photographing or capturing an image.

The input unit 125 may receive not only a photographing command or an image capture command, but also a user command for adjusting magnification of a photographing image.

A photographing magnification adjustment command may be a user command used to presses a button included in the image photographing apparatus 100. For example, when the input unit 125 includes a top button and a bottom button, while a live view image is displayed, if a user command for pressing the top button is input, the live view image may be magnified. While the live view image is displayed, if a user command for pressing the bottom button is input, the live view image may be reduced.

The input unit 125 may be implemented as the touch screen to receive the user command for adjusting magnification of the photographing image through the display unit 150.

The SDRAM 160 is used to store an image or is used for an image job by a CPU. In an exemplary embodiment, a double data rate (DDR) SDRAM that allows outputs of both a rising end and a falling end of a system clock, which improves by 2 times the outputs of the rising and falling ends compared to an output of the rising end, may be used.

The memory card 170 may be configured to include a flash memory and may be implemented in a card type that is detachable from the image photographing apparatus 100. The memory card 170 may store a photographed image file. The storage unit 120 described with reference to FIG. 1 may be included in the memory card 170.

Although the plurality of photographing units 110 are installed in a fixed location of the image photographing apparatus 100 in exemplary embodiments described above, at least one of the plurality of photographing units 110 may be disposed to be movable in the image photographing apparatus 100 or may be implemented as a separate independent device to be connectable to the image photographing apparatus 100. A configuration of photographing units of the image photographing apparatus 100 according to various exemplary embodiments will now be described in detail below.

FIGS. 18 through 25 are diagrams for explaining structures of photographing units of an image photographing apparatus according to one or more exemplary embodiments.

Figure 18:
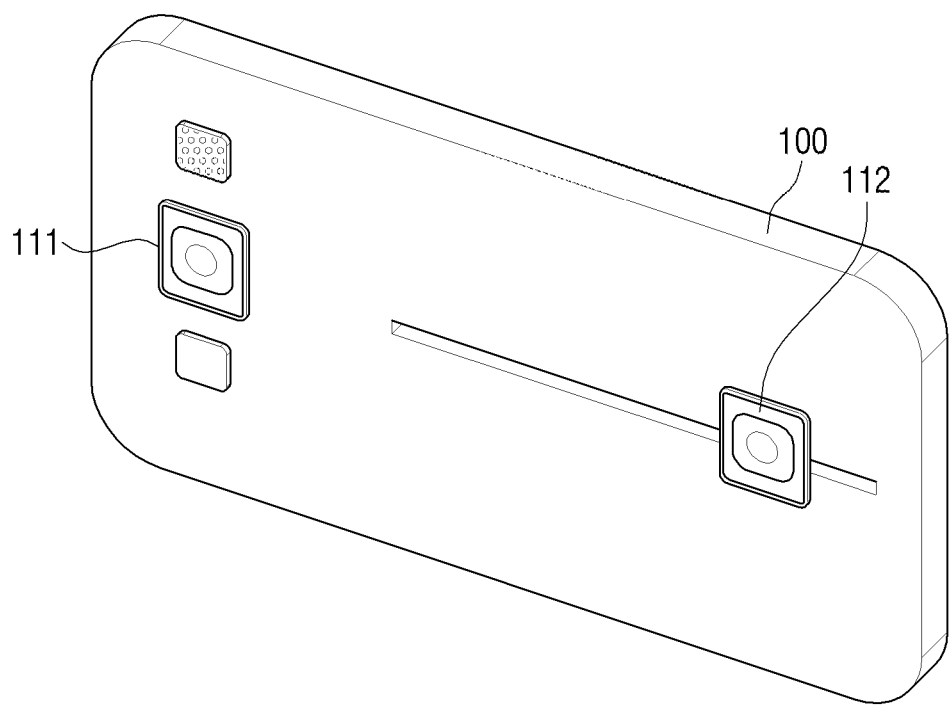
FIGS. 18 through 25 are diagrams for explaining structures and coupling structures of an image photographing apparatus according to one or more exemplary embodiments.

Referring to FIG. 18, the first photographing unit 111 among the plurality of photographing units 111 and 112 is disposed in a fixed location, and the second photographing unit 112 is manufactured in a movable shape. Various connection structures may be used to allow the second photographing unit 112 to be connectable to the image photographing apparatus 100. As an example, a groove or a rail may be formed (e.g., provided) in one surface of the image photographing apparatus 100. In this case, the second photographing unit 112 may be combined with the image photographing apparatus 100 according to a protrusion structure in which the second photographing unit 112 is inserted into the groove or the rail and may be movable along the groove or the rail.

Accordingly, a user may photograph a desired field of view and a desired subject and may acknowledge the desired field of view and the desired subject through a live view image while adjusting a location of the second photographing unit 112.

As described above, the first photographing unit 111 and the second photographing unit 112 may be designed to have different specifications such as a type, a photographing magnification, a field of view, etc. For example, the first photographing unit 111 may include a wide angle lens, and the second photographing unit 112 may include a telephoto lens.

The image processing process and the process of generating a synthesis image corresponding to a changed photographing magnification performed by the image processing unit 130 and the control unit 140 may be applied to the structure of the image photographing apparatus 100 of FIG. 18 in the same manner.

Figure 19:
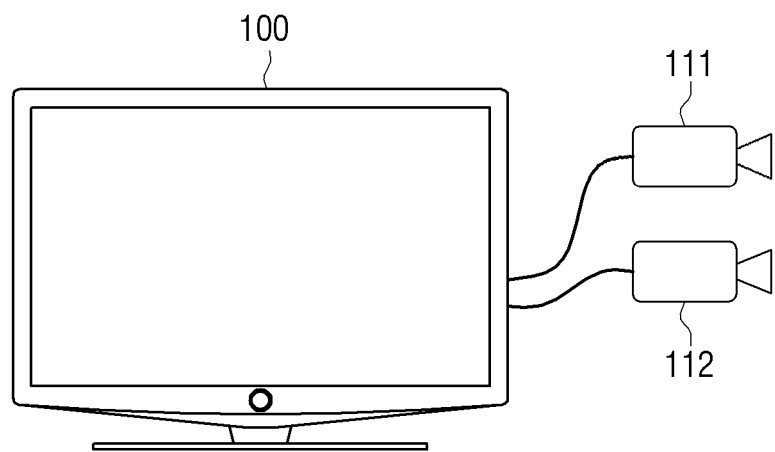

Alternatively, as shown in FIG. 19, the image photographing apparatus 100 may be connected to the external photographing unit 110 and perform photographing. In this case, an image photographing apparatus such as a TV or a laptop PC having no photographing function may operate as the image photographing apparatus 100 as described above.

Although the user may personally perform photographing by using the image photographing apparatus 100 including the plurality of photographing units 110, when the plurality of photographing units 110 are connected to the image photographing apparatus 100 to perform photographing, the image processing process and the process of generating the synthesis image corresponding to the changed photographing magnification performed by the image processing unit 130 and the control unit 140 may be applied in the same manner.

For example, FIG. 19 illustrates a TV as the image photographing apparatus 100. The control unit 140 of the TV may adjust properties of images obtained through the first photographing unit 111 and the second photographing unit 112 connected to the TV to correspond to each other, and, if a change command for changing a photographing magnification is input through a remote controller or a touch screen included in the display unit 150, the control unit 140 may synthesize the plurality of images of which properties are adjusted, may generate a synthesis image corresponding to the changed photographing magnification, and may output the synthesis image on the display unit 150 of the TV.

Although the first photographing unit 111 and the second photographing unit 112 are connected to the TV by wire in FIG. 19, a wireless communication method may be used to perform communication through the communication unit 135 described with reference to FIG. 17 above.

According to FIG. 19 described above, even when the plurality of photographing units 110 are not integrally provided in the image photographing apparatus 100 (or in an image processing apparatus), the user connects the plurality of independent photographing units 110 to the image photographing apparatus 100 by wire or wirelessly. Thus, if a desired photographing magnification is input through the image photographing apparatus 100, the control unit 140 of the image photographing apparatus 100 may adjust properties of a plurality of images photographed by the plurality of photographing units 110 to correspond to each other, may synthesize the plurality of images of which properties are adjusted, may generate a synthesis image corresponding to the changed photographing magnification, and may display the synthesis image as a live view image. If a reproduction magnification desired by the user is input while reproducing the photographed images, the control unit 140 of the image photographing apparatus 100 may synthesize the plurality of images of which properties are adjusted, may generate a synthesis image corresponding to the changed reproduction magnification, and may display the synthesis image.

Figure 20:
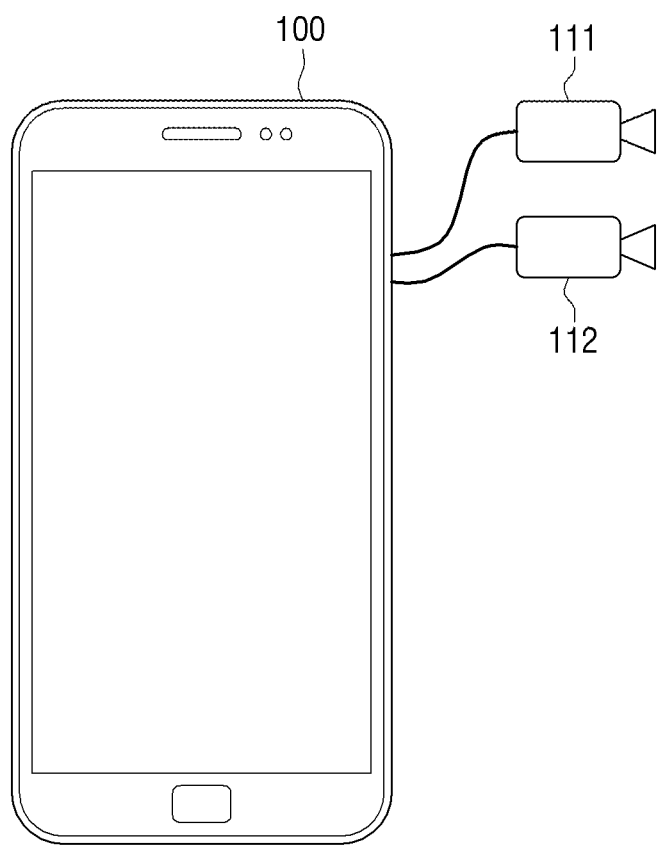

In the same manner as in FIG. 19, a case in which the plurality of photographing units 110 are not included in the image photographing apparatus 100, are independently present, and are connected to the image photographing apparatus 100 is illustrated in FIG. 20 in which a smart phone is illustrated as the image photographing apparatus 100.

Likewise, as described with reference to FIG. 19 above, even when the plurality of photographing units 110 are not integrally provided in the smart phone 100, the user connects the plurality of independent photographing units 110 to the smart phone 100 by wire or wirelessly. Thus, if a desired photographing magnification is input through the smart phone 100, the control unit 140 of the smart phone 100 may adjust properties of a plurality of images photographed by the plurality of photographing units 110 to correspond to each other, may synthesize the plurality of images of which properties are adjusted, may generate a synthesis image corresponding to the changed photographing magnification, and may display the synthesis image as a live view image. If a reproduction magnification desired by the user is input while reproducing the photographed images, the control unit 140 of the smart phone 100 may synthesize the plurality of images of which properties are adjusted, may generate a synthesis image corresponding to the changed reproduction magnification, and may display the synthesis image.

Meanwhile, with respect to not only a case in which the plurality of photographing units 110 are included in or connected to the one image photographing apparatus 100 but also the photographing apparatuses 100 and 200 respectively including photographing units 100-1 and 200-1, the image processing process and the process of generating the synthesis image corresponding to the changed photographing magnification performed by the image processing unit 130 and the control unit 140 may be applied in the same manner.

Figure 21:
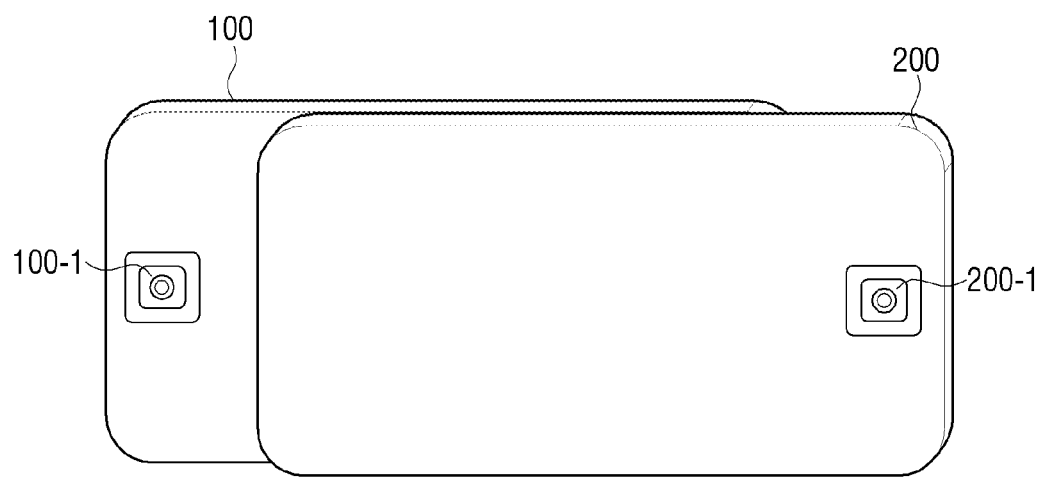

In FIG. 21, the photographing apparatuses 100 and 200 are implemented as smart phones. The user may perform photographing by overlapping the plurality of photographing apparatuses 100 and 200 like FIG. 21 (or by placing the plurality of photographing apparatuses 100 and 200 side-by-side). In this case, if a connection structure (for example, an unevenness structure, a connection ring, magnetic members, latches, etc.) for a reciprocal connection is provided in the plurality of photographing apparatuses 100 and 200, the user may fixedly connect the plurality of photographing apparatuses 100 and 200 by using the connection structure. If there is no connection structure, the user may perform photographing by simultaneously holding the plurality of photographing apparatuses 100 and 200 with a user's hand personally.

The user may connect the two photographing apparatuses 100 and 200 through a wired or wireless communication interface to perform photographing by using the plurality of photographing apparatuses 100 and 200.

In this status, if a photographing command is input, the respective photographing units 100-1 and 200-1 of the plurality of photographing apparatuses 100 and 200 perform photographing, a plurality of photographed images are stored in a storage unit of each of the plurality of photographing apparatuses 100 and 200, and a control unit of each of the plurality of photographing apparatuses 100 and 200 may adjust properties of the plurality of photographed images, synthesize the plurality of photographed images of which properties are adjusted, and generate a synthesis image.

During photographing, if a change command for changing a photographing magnification is input from the user, the control unit of each of the plurality of photographing apparatuses 100 and 200 may display a synthesis image corresponding to the changed photographing magnification.

A point of view or a field of view of each of the plurality of photographing apparatuses 100 and 200 is different, and thus the control unit of each of the plurality of photographing apparatuses 100 and 200 may combine the point of view and the field of view to generate various forms of photographing images. For example, the control unit may generate 3D contents having an image photographed by an image photographing apparatus positioned in the left as a left eye image and an image photographed by an image photographing apparatus positioned in the right as a right eye image. Alternatively, the control unit may generate a synthesis image that replaces a part of an image photographed by an image photographing apparatus using a wide angle lens with at least a part of an image photographed by an image photographing apparatus using a telephoto lens. Alternatively, the control unit may allow the first photographing unit 100-1 to photograph a moving image and the second photographing unit 200-1 to photograph a still image or allow the first photographing unit 100-1 to photograph the still image and the second photographing unit 200-1 to photograph the moving image and may generate a synthesis image of the moving image and the still image.

Meanwhile, a communication connection between the plurality of photographing apparatuses 100 and 200 may be automatically performed. For example, if a common photographing command is input in the first image photographing apparatus 100, the first image photographing apparatus 100 may search for another image photographing apparatus positioned within a previously set distance by using near field communication such as Bluetooth or NFC. As a result of search, if the second image photographing apparatus 200 is found, the first image photographing apparatus 100 may connect for communication with the found second image photographing apparatus 200. Alternatively, if tagging is performed between the plurality of photographing apparatuses 100 and 200, communication may be automatically performed.

If communication is connected, the user may photograph images by using the photographing apparatuses at one time, and the control unit may display a live view or a photographing image through a display unit included in one of the photographing apparatuses. The user may input various user commands such as a capture command, a photographing magnification change command, a storage command, etc., through at least one of the photographing apparatuses.

Meanwhile, an example in which the photographing apparatuses 100 and 200 are implemented as smart phones respectively including the photographing units 100-1 and 200-1 is described in FIG. 21. However, this is merely an exemplary embodiment and the image photographing apparatus 100 may be implemented as various electronic devices such as a tablet PC, a digital camera, a camcorder, a PDA, a PMP including a camera unit, etc.

Figure 22:
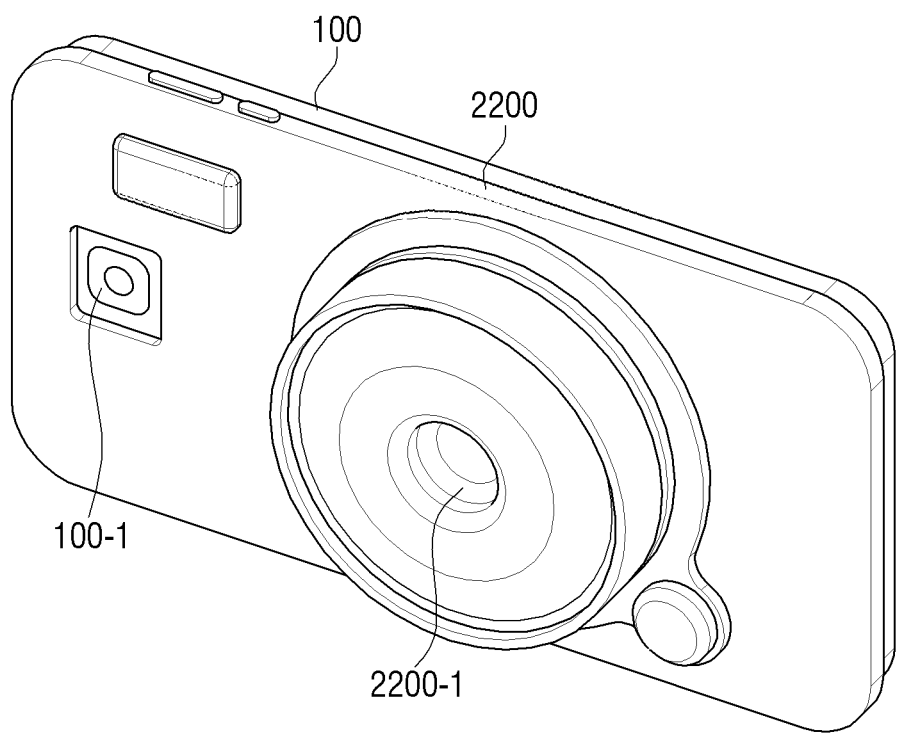

A combining structure of an image photographing apparatus including different types of photographing apparatuses 100 and 2200 is illustrated in FIG. 22.

Referring to FIG. 22, the user may produce a photographing system by connecting the first image photographing apparatus 100 implemented as a cellular phone and a second image photographing apparatus 2200 implemented as a camera. The second image photographing apparatus 2200 of FIG. 22 may be manufactured in a physically combinable structure to the first image photographing apparatus 100. FIG. 22 illustrates a state in which the second image photographing apparatus 2200 is connected in a surface direction in which the photographing unit 100-1 is disposed in the first image photographing apparatus 100. In this case, the plurality of photographing apparatuses may be manufactured by removing a battery cover of a rear surface of the first image photographing apparatus 100 and connecting the second image photographing apparatus 2200 to the first image photographing apparatus 100 by using a connection structure between the battery cover and a main body. For convenience of description, such a type of an image photographing apparatus is referred to as a cover type photographing apparatus. The cover type image photographing apparatus will be described in detail with reference to FIGS. 23 and 24.

Figure 23:
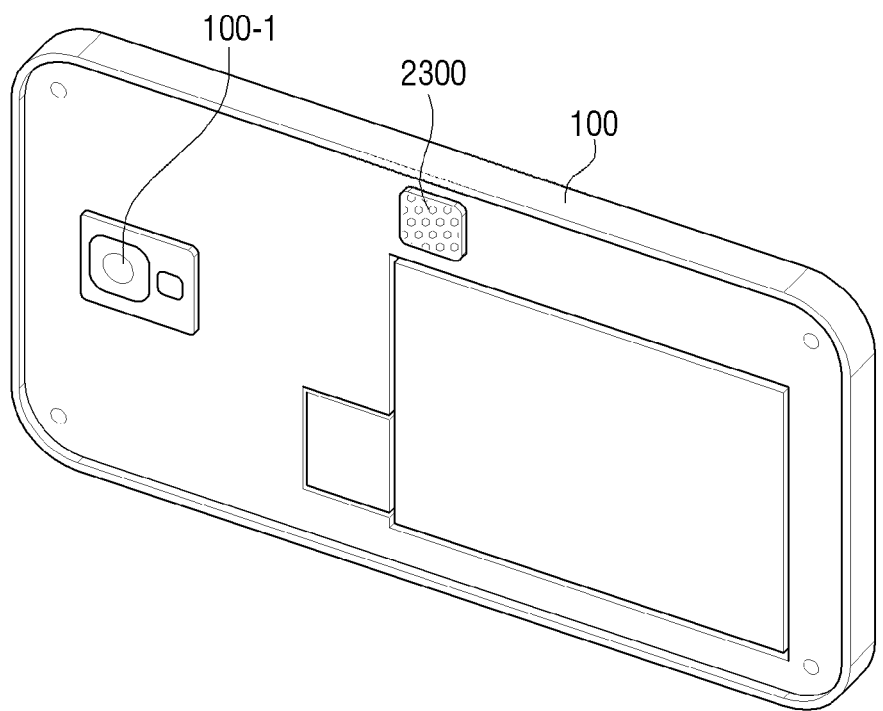

FIG. 23 illustrates a state in which the battery cover of the first image photographing apparatus 100 is removed. The battery cover may include a plurality of protrusions insertable into various grooves formed in the rear surface of the main body of the first image photographing apparatus 100. The user may attach and detach the battery cover by using the protrusions and the grooves. A battery as well as an interface unit 2300 (e.g., interface or interface device) may be included in the rear surface of the image photographing apparatus 100 packaged by the battery cover. That is, if the battery cover is removed from the image photographing apparatus 100, the interface unit 2300 may be exposed.

Figure 24:
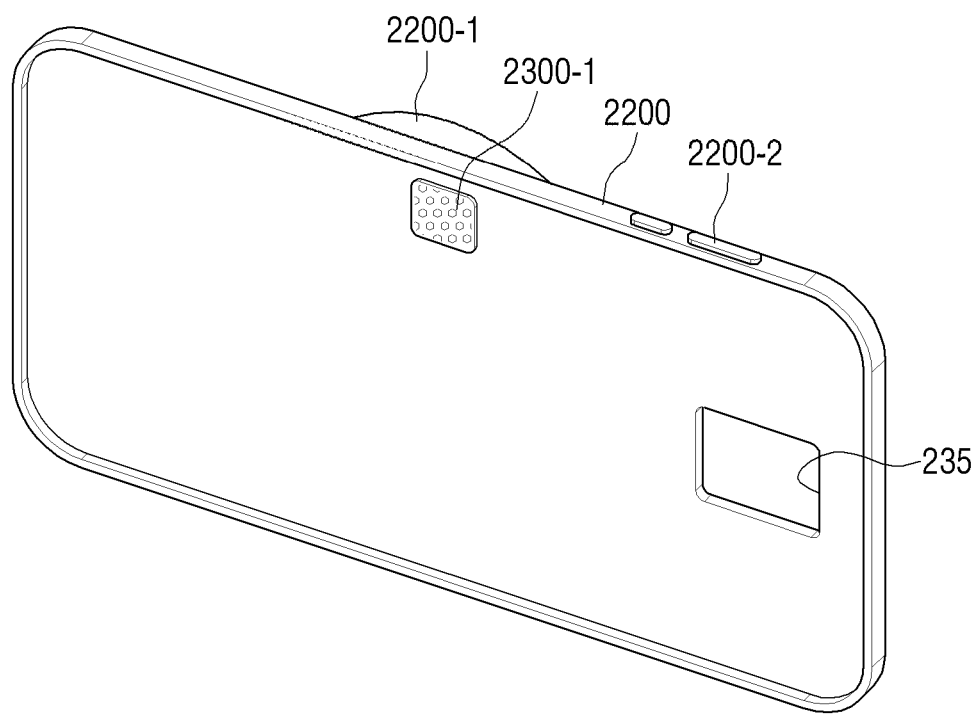

FIG. 24 illustrates an exterior rear surface of the second image photographing apparatus 2200 that is to be coupled to the first image photographing apparatus 100. The second image photographing apparatus 2200 may be implemented in a connectable case type by replacing the battery cover on a surface from which the battery cover of the first image photographing apparatus 100 is removed.

The second image photographing apparatus 2200 may include an interface unit 2300-1, a photographing unit 2200-1, and a shutter button 2200-2 that are to be coupled to the first image photographing apparatus 100.

The second image photographing apparatus 2200 may include a coupling unit that is to be coupled and fixed to a groove of the first image photographing apparatus 100. If a cover for covering one surface of the first image photographing apparatus 100 is removed, the second image photographing apparatus 2200 may be coupled to a location from which the cover is removed.

The second image photographing apparatus 2200 may include an opening region 235 in a location corresponding to the photographing unit 100-1 of the first image photographing apparatus 100 in order not to hide the photographing unit 100-1 of the first image photographing apparatus 100, and thus, if the first image photographing apparatus 100 and the second image photographing apparatus 2200 are coupled to each other, the photographing unit 100-1 of the first image photographing apparatus 100 may be positioned in the opening region 235.

The interface unit 2300-1 of the second image photographing apparatus 2200 may be positioned to be in contact with the interface unit 2300 of the first image photographing apparatus 100.

If the first image photographing apparatus 100 and the second image photographing apparatus 2200 are connected to each other as described above, the photographing unit 2200-1 of the second image photographing apparatus 2200 may perform photographing separately from the photographing unit 100-1 of the first image photographing apparatus 100. In particular, the photographing unit 2200-1 of the second image photographing apparatus 2200 may include a lens having a different field of view from that of a lens included in the photographing unit 100-1 of the first image photographing apparatus 100. For example, the photographing unit 100-1 of the first image photographing apparatus 100 may include a wide angle lens, and the photographing unit 2200-1 of the second image photographing apparatus 2200 may include a telephoto lens.

Meanwhile, the second image photographing apparatus 2200 may include an input unit. The input unit may include at least one button, a rotatable dial, etc. That is, the button may be formed in a push type or a touch type, and may include at least one of a power/lock button, a shutter button, a menu button, a home button, a back button, and a search button. In particular, the second image photographing apparatus 2200 may include a shutter button 2200-1 for capturing an image.

If an image capture command is input through the shutter button 2200-1, the second image photographing apparatus 2200 may capture an image photographed through the photographing unit 2200-1 and may transfer the image capture command to the first image photographing apparatus 100 through the interface unit 2300-1.

Alternatively, if the image capture command is input through the shutter button 2200-1, the second image photographing apparatus 2200 may transfer the image capture command to the first image photographing apparatus 100 through the interface unit 2300-1. Then, the first image photographing apparatus 100 may simultaneously capture images photographed by the first image photographing apparatus 100 and the second image photographing apparatus 2200.

Thus, if the image capture command is input through the shutter button 2200-1, the images photographed through the photographing units 100-1 and 2200-1 of the first image photographing apparatus 100 and the second image photographing apparatus 2200 may be simultaneously captured.

The control unit 140 of the first image photographing apparatus 100 may adjust properties of images obtained through the photographing units 100-1 and 2200-1 of the first image photographing apparatus 100 and the second image photographing apparatus 2200 to correspond to each other, and, if a change command for changing a photographing magnification is input, may synthesize the plurality of images of which properties are adjusted and may generate and display a synthesis image corresponding to the changed photographing magnification.

Figure 25:
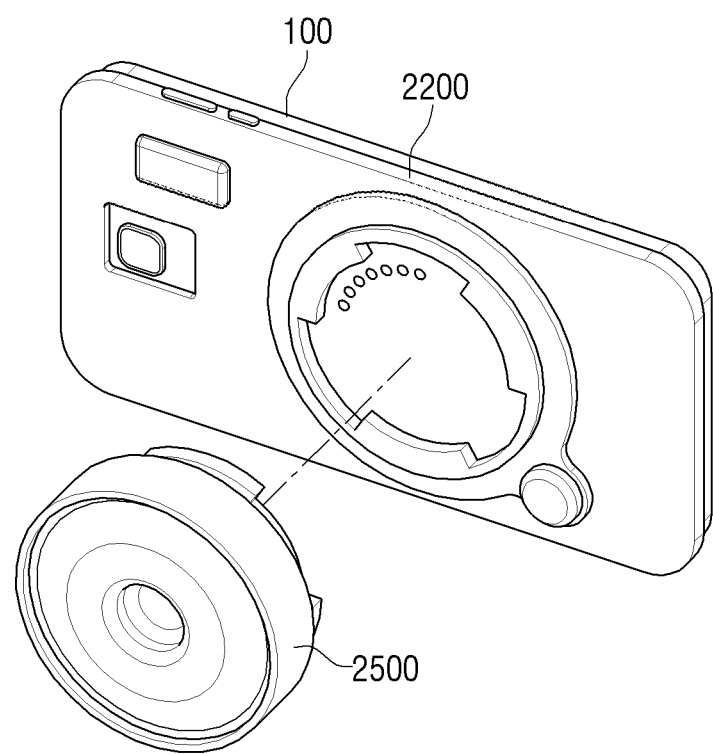

Meanwhile, referring to FIG. 25, a lens 2500 may have a detachable form from the second image photographing apparatus 2200. That is, FIG. 25 illustrates a structure in which the second image photographing apparatus 2200 using the detachable lens 2500 and the first image photographing apparatus 100 are connected to each other.

The user may change the lens 2500 of various types according to a type of a photographing image, a photographing magnification, etc., and may attach the lens 2500 to the second image photographing apparatus 2200. For example, a telephoto lens may be attached to the second image photographing apparatus 2200. Thus, various photographing effects may be implemented by variously changing performance of the second image photographing apparatus 2200 used with the first image photographing apparatus 100.

Meanwhile, in the exemplary embodiment of FIG. 25 described above, a unifocal lens as well as a zoom lens may be detached. That is, according to an exemplary embodiment, although synthesis images of 2×, 3×, and 4× magnifications are generated by using a 1× magnification lens and a 5× magnification lens, the synthesis images of 2×, 3×, and 4× magnifications may be generated by using the 1× magnification lens and a 10× magnification lens. The image processing process and the process of generating the synthesis image corresponding to the changed photographing magnification performed by the image processing unit 130 and the control unit 140 described above may be applied to the plurality of images obtained through the unifocal lens and the zoom lens in the same manner.

Likewise, the image processing process and the process of generating the synthesis image corresponding to the changed photographing magnification performed by the image processing unit 130 and the control unit 140 described above may be applied to the various coupling structures between the plurality of photographing apparatuses as shown in FIGS. 21 through 25 in the same manner.

Meanwhile, the lenses included in the plurality of photographing units 110 according to an exemplary embodiment may face in different directions. In this regard, the image processing unit 130 may perform at least one of calibration and rectification on a difference generated by the different directions of the lenses and may modify a plurality of images as images photographed when the lenses face in the same direction, and the control unit 140 may control the image processing unit 130 to connect and synthesize the modified images and generate a single whole image.

In more detail, when directions in which the lenses included in the plurality of photographing units 110 face are different, images photographed through the plurality of photographing units 110 are different, and thus the image processing unit 130 may correct the different images photographed through the plurality of photographing units 110 to modify the images as if they are photographed through the lenses facing the same direction. In this case, the control unit 140 may control the image processing unit 130 to connect the modified images and generate a single whole image. In this regard, the single whole image may be, for example, a panoramic image.

Although the directions in which the lenses included in the plurality of photographing units 110 face are not different, that is, although the lenses face in the same direction, when distances between the plurality of photographing units 110 are far away, the images photographed through the plurality of photographing units 110 are different. In this case, the control unit 140 may control the image processing unit 130 to connect the different images photographed through the plurality of photographing units 110 and generate the single whole image. For example, in FIG. 1, the photographing units 111 and 112 may be implemented to move so that a distance between the photographing units 111 and 112 may be changed.

Meanwhile, the control unit 140 may control the image processing unit 130 to perform feature matching based on the different images photographed through the plurality of photographing units 110. That is, the control unit 140 may control the image processing unit 130 to extract a feature point that is a reference from each of the different images and compare the extracted feature points.

In particular, when an overlapping region is present between the different images photographed through the plurality of photographing units 110, the control unit 140 may control the image processing unit 130 to perform the feature matching based on the overlapping region.

The control unit 140 may control the image processing unit 130 to arrange the different images to be naturally connected based on a result of comparing the extracted feature points.

The control unit 140 may control the image processing unit 130 to blend the different images by giving a weight to each of pixels in a state where the different images are arranged to be naturally connected. In this regard, a blending method may include alpha blending, Laplacian blending, gradient domain blending, etc.

Such a synthesized image presents a single whole image and may be mainly implemented as a panoramic image.

Such a single whole image may be variously changed according to at least one of a field of view of each of the lenses included in the plurality of photographing units 110, a distance between the lenses, magnification of each lens, etc.

Figure 26:
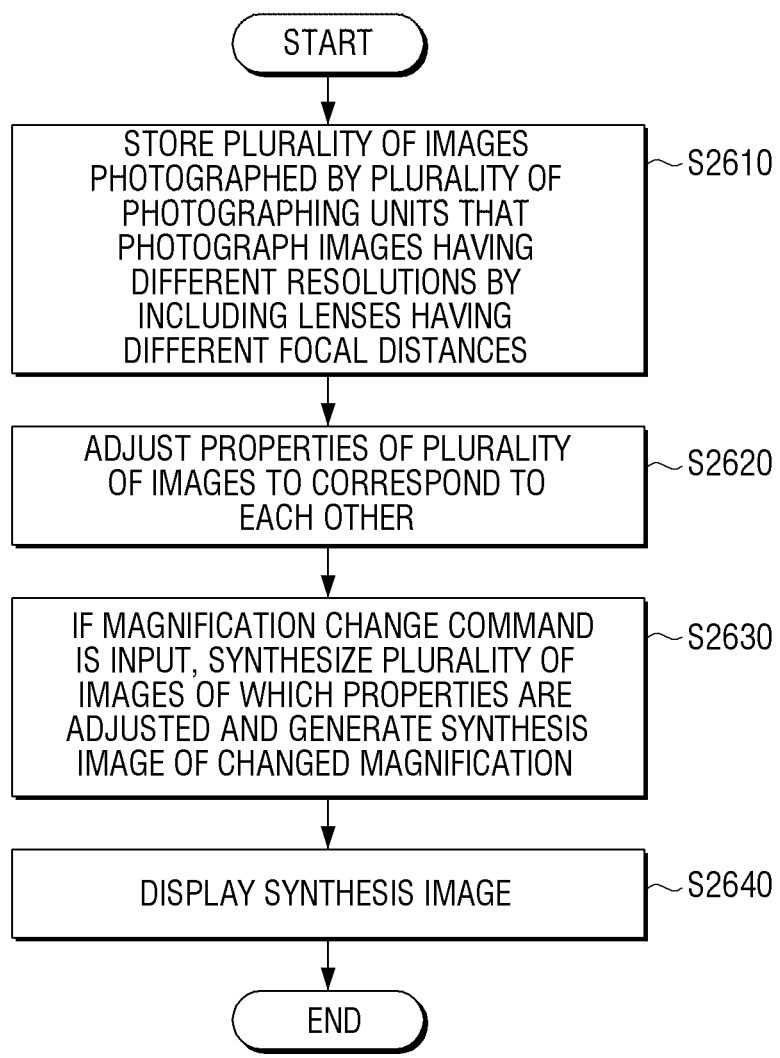
FIG. 26 is a flowchart of an image photographing method performed by an image photographing apparatus including a plurality of photographing units using lenses having different focal distances according to an exemplary embodiment.

FIG. 26 is a flowchart of an image photographing method performed by an image photographing apparatus including a plurality of photographing units using lenses having different focal distances according to an exemplary embodiment.

According to the method illustrated in FIG. 26, a plurality of images of different resolutions photographed by the plurality of photographing units are stored (operation S2610).

Properties of the plurality of images are adjusted to correspond to each other (operation S2620).

In this regard, a property of an image includes a color and a white balance. In operation S2620, colors and white balances of other images are adjusted in the same manner with respect to a color and a white balance of one of the plurality of images.

The plurality of photographing units include a first photographing unit including a wide angle lens and at least one second photographing unit including a telephoto lens. In operation S2620, a color and a white balance of at least one second image obtained from the at least one second photographing unit are adjusted with respect to a color and a white balance of a first image obtained from the first photographing unit.

Thereafter, if a magnification change command is input, the plurality of images of which properties are adjusted are synthesized to generate a synthesis image of a magnification changed according to the magnification change command (operation S2630).

In this regard, in operation S2630, the synthesis image may be generated by detecting and synthesizing local regions of a size corresponding to the changed photographing magnification from the plurality of images.

In operation S2630, a synthesis rate of each of the plurality of images is adjusted based on a movement degree of a subject in a common region included in the plurality of images.

An image sensor included in each of the plurality of photographing units includes color pixels having different patterns. In operation S2630, the synthesis image expressing a physical property of the subject is generated based on a plurality of different color spectrum information obtained from the color pixels having different patterns.

At least one image sensor further includes a pixel detecting depth information of the subject. In operation S2630, a 3D image of the magnification changed according to the magnification change command is generated based on the detected depth information.

The synthesis image is displayed (operation S2640).

Meanwhile, the image photographing method performed by the image photographing apparatus according to an exemplary embodiment may further include an operation of synchronizing timing of reset signals provided to an image sensor included in each of the plurality of photographing units and synchronizing photographing timing of the plurality of photographing units.

The image photographing method performed by the image photographing apparatus according to an exemplary embodiment may further include an operation of determining whether to synchronize the plurality of images based on a common region included in the plurality of images, and, if the plurality of images are in an asynchronous state, performing delay processing on at least one image frame, and synchronizing the plurality of images.

The image photographing method performed by the image photographing apparatus according to an exemplary embodiment may further include an operation of determining whether to synchronize the plurality of images based on a common region included in the plurality of images, and, if the plurality of images are in an asynchronous state, synchronizing photographing timing of the plurality of photographing units.

The image photographing method performed by the image photographing apparatus according to an exemplary embodiment may further include an operation of displaying an indicator that indicates a plurality of regions having different resolutions included in the synthesis image of the magnification changed according to the magnification change command, and, if a user command is input with respect to the indicator, displaying at least one of the plurality of images corresponding to each of the plurality of regions.

The image photographing method performed by the image photographing apparatus according to an exemplary embodiment may further include an operation of performing calibration/rectification on a difference generated by different directions in which lenses included in the plurality of photographing units face, and modifying the plurality of images as images photographed when the lenses face in the same direction, and connecting and synthesizing the modified images and generating a single whole image.

Meanwhile, a non-transitory computer readable medium storing a program sequentially performing the image photographing method according to an exemplary embodiment may be provided.

As an example, a non-transitory computer readable medium storing a program performing operations of storing a plurality of images photographed by a plurality of photographing units that photograph images having different resolutions by including lenses having different focal distances, adjusting properties of the plurality of images to correspond to each other, if a change command for changing a photographing magnification is input, synthesizing the plurality of images of which properties are adjusted, and generating a synthesis image corresponding to a changed photographing magnification may be provided.

As another example, a non-transitory computer readable medium storing a program performing operations of synchronizing providing timing of reset signals provided to an image sensor included in each of the plurality of photographing units and synchronizing photographing timing of the plurality of photographing units, determining whether to synchronize the plurality of images based on a common region included in the plurality of images, and, if the plurality of images are in an asynchronous state, performing delay processing on at least one image frame, and synchronizing the plurality of images, determining whether to synchronize the plurality of images based on the common region included in the plurality of images, and, if the plurality of images are in an asynchronous state, synchronizing the plurality of photographing units and the photographing timing, and displaying an indicator that indicates a plurality of regions having different resolutions included in the synthesis image corresponding to the changed photographing magnification, and, if a user command is input with respect to the indicator, displaying at least one of the plurality of images corresponding to each of the plurality of regions may be provided.

The non-transitory computer readable medium is not a medium storing data for a short instant period such as a register, a cache, a memory, etc. but is a medium storing data semi-permanently and capable of being read by a device. In more detail, the above-described various applications or programs may be provided by being stored in the non-transitory computer readable medium such as a compact disc (CD), a digital versatile disc (DVD), a hard disk, a Blu-ray disc, a USB, a memory card, a ROM, etc.

In the block diagram of the image photographing apparatus described above, communication between constituents of the image photographing apparatus may be performed via a bus. Each device may further include a processor that performs the above-described various operations, such as a CPU, a micro-processor, etc.

According to one or more exemplary embodiments as described above, an image having an expanded magnification may be generated by synthesizing a plurality of images obtained through a plurality of photographing units while maintaining a good image quality.

The apparatus according to an exemplary embodiment may include a processor, a memory that stores and executes program data, a permanent storage such as a disk drive, a communication port that communicates with an external apparatus, and a user interface apparatus such as a touch panel, a key, and a button. The methods that are implemented with a software module or an algorithm are codes or program commands that are executable on the processor and readable by a computer, and may be stored in a recording medium readable by a computer. The recording medium readable by a computer may include a magnetic storage medium (for example, a read-only memory, a random-access memory, a floppy disk, a hard disk, etc.) and an optical readable medium (for example, a compact disk read-only memory (CD-ROM), a digital versatile disk (DVD), etc.). The recording medium readable by a computer may disperse in computer systems that are connected over a network so that a code readable by a computer may be stored and executed in a dispersion method. The medium may be readable by a computer, be stored in a memory, and be executed by a processor.

Exemplary embodiments may be represented by functional block components and diverse processing steps. The functional blocks may be implemented with diverse numbers of hardware and/or software components that execute specific functions. For example, an exemplary embodiment may employ direct circuit components, such as a memory, processing, logic, and a look-up table, that execute diverse functions by control of one or more microprocessors or other control apparatuses. As the components are executed as software programming or software elements, exemplary embodiments may be realized in a programming or scripting language such as C, C++, Java, and assembler, including diverse algorithms that are implemented with data structure, processes, routines, or combination of other programming components. The functional factors may be implemented with an algorithm executed by one or more processors. In addition, exemplary embodiments may employ the related art for electronic configuration, signal processing, and/or data processing. The terms "mechanism", "element", "means", and "component" may be used in a broad sense, and is not limited to mechanical or physical components. The terms may include a set of routines of software that are connected with a processor.

The foregoing exemplary embodiments and advantages are merely exemplary and are not to be construed as limiting the present inventive concept. For simplicity of the specification, electronic components, control systems, software, and other functional factors in the related art may be omitted. In addition, connection of lines or connection members between the components in the drawings illustrate functional connection and/or physical or circuital connection as example, and thus in a real apparatus, replaceable or additional diverse functional connection, physical connection or circuital connection may be provided.

In this specification (and in the claims), the use of the term "the" and similar referential terms may refer to both the singular and the plural. In addition, when a range is written, individual values within the range are included (if there is no contrary mention). Accordingly, it is the same as the individual values that compose the range are written in the detailed description. Finally, the steps that compose the method may be performed in appropriate order if the order is not obviously written or if there is no contrary mention.

Exemplary embodiments are not always limited to the order in which the steps are written. Also, the description of the exemplary embodiments is intended to be illustrative, and not to limit the scope of the claims, and many alternatives, modifications, and variations will be apparent to those skilled in the art.

What is claimed is:

1. An image photographing apparatus comprising:
    a plurality of image capturers respectively comprising lenses having different focal distances and respectively configured to capture a plurality of images having different resolutions;
    a storage configured to store the plurality of images captured by the plurality of image capturers;
    an image processor configured to adjust properties of the plurality of captured images to correspond to each other;
    a controller configured to, in response to a magnification change command being input, control the image processor to synthesize the plurality of captured images of which the properties are adjusted and generate a synthesis image of a magnification changed according to the magnification change command; and
    a display configured to display the synthesis image,
    wherein the controller determines a movement size based on a movement degree of a subject in a common region included in the plurality of captured images, adjusts a synthesis ratio of a first image from among the plurality of captured images to increase and a synthesis ratio of a remaining second image to decrease in accordance with the determined movement size, and synthesizes the first image and the second image at the adjusted synthesis ratios.

2. The image photographing apparatus as claimed in claim 1, wherein the controller is configured to control the image processor to detect each of local regions of a size corresponding to the changed magnification from the plurality of images and to synthesize the detected local regions to generate the synthesis image.

3. The image photographing apparatus as claimed in claim 2, wherein the controller is configured to output, for display, an indicator that indicates a plurality of regions having different resolutions included in the synthesis image of the magnification changed according to the magnification change command, and to, in response to a user command being input with respect to the indicator, display at least one of the plurality of images corresponding to each of the plurality of regions.

4. The image photographing apparatus as claimed in claim 3, wherein:
    the lenses included in the plurality of image capturers face in different directions;
    the image processor is configured to perform at least one of calibration and rectification on a difference generated by the different directions of the lenses and to modify the plurality of images as images captured when the lenses face in the same direction; and
    the controller is configured to control the image processor to connect and synthesize the modified images and generate a single whole image.

5. The image photographing apparatus as claimed in claim 1, wherein the controller is configured to synchronize timing of a reset signal provided to each of image sensors included in the plurality of image capturers and to synchronize capturing timing of the plurality of image capturers.

6. The image photographing apparatus as claimed in claim 1, wherein the controller is configured to determine whether to synchronize the plurality of images based on a common region included in the plurality of images, and to, if the plurality of images are in an asynchronous state, perform delay processing on at least one image frame and synchronize the plurality of images.

7. The image photographing apparatus as claimed in claim 1, wherein the controller is configured to determine whether to synchronize the plurality of images based on a common region included in the plurality of images, and to, if the plurality of images are in an asynchronous state, synchronize capturing timing of the plurality of image capturers.

8. The image photographing apparatus as claimed in claim 1, wherein:
    the properties of the plurality of images include a color and a white balance; and
    the controller is configured to adjust colors and white balances of an image, among the plurality of images, according to a color and a white balance of another image, among the plurality of images.

9. The image photographing apparatus as claimed in claim 8, wherein:
    the plurality of image capturers comprises a first image capturer including a wide angle lens and at least one second image capturer including a telephoto lens; and
    the controller is configured to adjust a color and a white balance of at least one second image obtained from the at least one second image capturer according to a color and a white balance of a first image obtained from the first image capturer.

10. The image photographing apparatus as claimed in claim 1, wherein:
    the plurality of image capturers respectively further comprise image sensors with color pixels having a same pattern or different patterns; and
    the controller is configured to generate the synthesis image expressing a physical property of a subject based on a plurality of color spectrum information obtained from the image sensors including the color pixels having the same pattern or the different patterns.

11. The image photographing apparatus as claimed in claim 10, wherein:
    at least one image sensor, among the image sensors, includes a pixel detecting depth information of the subject; and
    the controller is configured to generate a three-dimensional (3D) image of the changed magnification based on the detected depth information.

12. An image photographing method performed by an image photographing apparatus including a plurality of image capturers using lenses having different focal distances, the method comprising:
    storing a plurality of images having different resolutions captured by the plurality of image capturers;
    adjusting properties of the plurality of captured images to correspond to each other;
    in response to a magnification change command being input, generating a synthesis image of a magnification changed according to the magnification change command by synthesizing the plurality of captured images of which the properties are adjusted; and
    outputting the synthesis image,
    wherein the generating the synthesis image comprises determining a movement size based on a movement degree of a subject in a common region included in the plurality of captured images, adjusting a synthesis ratio of a first image from among the plurality of captured images to increase and a synthesis ratio of a remaining second image to decrease in accordance with the determined movement size, and synthesizing the first image and the second image at the adjusted synthesis ratios.

13. The image photographing method as claimed in claim 12, wherein the generating the synthesis image comprises detecting each of local regions of a size corresponding to the changed magnification from the plurality of images and synthesizing the detected local regions to generate the synthesis image.

14. The image photographing method as claimed in claim 12, further comprising synchronizing timing of a reset signal provided to each of image sensors included in the plurality of image capturers and synchronizing capturing timing of the plurality of image capturers.

15. The image photographing method as claimed in claim 12, further comprising determining whether to synchronize the plurality of images based on a common region included in the plurality of images, and, if the plurality of images are in an asynchronous state, performing delay processing on at least one image frame and synchronizing the plurality of images.

16. The image photographing method as claimed in claim 12, further comprising determining whether to synchronize the plurality of images based on a common region included in the plurality of images, and, if the plurality of images are in an asynchronous state, synchronizing capturing timing of the plurality of image capturers.

17. The image photographing method as claimed in claim 12, wherein:
the properties of the plurality of images include a color and a white balance; and
the adjusting comprises adjusting colors and white balances of an image, from among the plurality of images, according to a color and a white balance of another image, among the plurality of images.

18. The image photographing method as claimed in claim 17, wherein:
the plurality of image capturers include a first image capturer including a wide angle lens and at least one second image capturer including a telephoto lens; and
the adjusting comprises adjusting a color and a white balance of at least one second image obtained from the at least one second image capturer according to a color and a white balance of a first image obtained from the first image capturer.

19. A non-transitory computer readable recording medium having recorded thereon a program executable by a computer for performing the method of claim 12.

20. An image photographing apparatus comprising:
a plurality of image capturers respectively configured to capture a plurality of images having different resolutions; and
an image processor configured to process the plurality of captured images;
a controller configured to, in response to a magnification change command being input, control the image processor to synthesize the plurality of captured images to generate a synthesis image of a magnification changed according to the magnification change command,
wherein the controller determines a movement size based on a movement degree of a subject in a common region included in the plurality of captured images, adjusts a synthesis ratio of a first image from among the plurality of captured images to increase and a synthesis ratio of a remaining second image to decrease in accordance with the determined movement size, and synthesizes the first image and the second image at the adjusted synthesis ratios.

21. The image photographing apparatus as claimed in claim 20,
wherein the controller is configured to control the image processor to detect each of local regions of a size corresponding to the changed magnification from the plurality of images and to synthesize the detected local regions to generate the synthesis image.

22. The image photographing apparatus as claimed in claim 21, wherein the controller is configured to output, for display, an indicator that indicates a plurality of regions having different resolutions included in the synthesis image of the magnification changed according to the magnification change command, and to, in response to a user command being input with respect to the indicator, display at least one of the plurality of images corresponding to each of the plurality of regions.

23. The image photographing apparatus as claimed in claim 22,
wherein the plurality of image capturers respectively comprise lenses that face in different directions,
wherein the image processor is configured to perform at least one of calibration and rectification on a difference generated by the different directions of the lenses and to modify the plurality of images as images captured when the lenses face in the same direction; and
wherein the controller is configured to control the image processor to connect and synthesize the modified images and generate a single whole image.

24. The image photographing apparatus as claimed in claim 20, wherein the controller is configured to synchronize timing of a reset signal provided to each of image sensors included in the plurality of image capturers and to synchronize capturing timing of the plurality of image capturers.

25. The image photographing apparatus as claimed in claim 20, wherein the controller is configured to determine whether to synchronize the plurality of images based on a common region included in the plurality of images, and to, if the plurality of images are in an asynchronous state, perform delay processing on at least one image frame and synchronize the plurality of images.

26. The image photographing apparatus as claimed in claim 20, wherein the controller is configured to determine whether to synchronize the plurality of images based on a common region included in the plurality of images, and to, if the plurality of images are in an asynchronous state, synchronize capturing timing of the plurality of image capturers.

27. The image photographing apparatus as claimed in claim 20,
wherein the image processor is configured to adjust properties of the plurality of images to correspond to each other;
wherein the properties of the plurality of images include a color and a white balance, and
wherein the controller is configured to adjust colors and white balances of an image, among the plurality of images, according to a color and a white balance of another image, among the plurality of images.

28. The image photographing apparatus as claimed in claim 27, wherein:
the plurality of image capturers comprises a first image capturer including a wide angle lens and at least one second image capturer including a telephoto lens; and the controller is configured to adjust a color and a white balance of at least one second image obtained from the at least one second image capturer according to a color and a white balance of a first image obtained from the first image capturer.

29. The image photographing apparatus as claimed in claim 20, wherein:
the plurality of image capturers respectively comprise image sensors with color pixels having a same pattern or different patterns; and
the controller is configured to generate the synthesis image expressing a physical property of a subject based on a plurality of color spectrum information obtained from the image sensors including the color pixels having the same pattern or the different patterns.

30. The image photographing apparatus as claimed in claim 29, wherein:
at least one image sensor, among the image sensors, includes a pixel detecting depth information of the subject; and
the controller is configured to generate a three-dimensional (3D) image of the changed magnification based on the detected depth information.

31. An image processing apparatus comprising:
an image processor configured to adjust properties of a plurality of images to correspond to each other, the plurality of images having different resolutions and respectively obtained from a plurality of image capturers having different focal distances; and
a controller configured to, in response to a magnification change command being input, control the image processor to synthesize the plurality of obtained images of which the properties are adjusted and generate a synthesis image of a magnification changed according to the magnification change command,
wherein the controller determines a movement size based on a movement degree of a subject in a common region included in the plurality of obtained images, adjusts a synthesis ratio of a first image from among the plurality of captured images to increase and a synthesis ratio of a remaining second image to decrease in accordance with the determined movement size, and synthesizes the first image and the second image at the adjusted synthesis ratios.

\* \* \* \* \*